United States Patent
Kim et al.

(10) Patent No.: US 11,030,143 B2
(45) Date of Patent: Jun. 8, 2021

(54) SYSTEM FOR SHARING CONTENT BETWEEN ELECTRONIC DEVICES, AND CONTENT SHARING METHOD FOR ELECTRONIC DEVICE

(71) Applicant: Samsung Electronics Co., Ltd., Suwon-si (KR)

(72) Inventors: Kwanguk Kim, Anyang-si (KR); Seungin Jung, Seoul (KR); Doosuk Kang, Suwon-si (KR); Changho Lee, Suwon-si (KR); Gyucheol Choi, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/475,234

(22) PCT Filed: Jan. 4, 2018

(86) PCT No.: PCT/KR2018/000210
§ 371 (c)(1),
(2) Date: Jul. 1, 2019

(87) PCT Pub. No.: WO2018/128432
PCT Pub. Date: Jul. 12, 2018

(65) Prior Publication Data
US 2019/0340150 A1    Nov. 7, 2019

(30) Foreign Application Priority Data

Jan. 4, 2017    (KR) .................. 10-2017-0001524

(51) Int. Cl.
*H04L 29/08*    (2006.01)
*G06F 15/16*    (2006.01)
(Continued)

(52) U.S. Cl.
CPC ............. *G06F 15/16* (2013.01); *G06Q 50/10* (2013.01); *H04L 65/4084* (2013.01); *H04L 67/1097* (2013.01)

(58) Field of Classification Search
CPC combination set(s) only.
See application file for complete search history.

(56) References Cited

U.S. PATENT DOCUMENTS

| | | | |
|---|---|---|---|
| 2013/0124617 A1* | 5/2013 | Lee ..................... | G06F 15/16 709/203 |
| 2014/0003820 A1 | 1/2014 | Lee et al. | |

(Continued)

FOREIGN PATENT DOCUMENTS

| | | |
|---|---|---|
| JP | 2014-011803 A | 1/2014 |
| KR | 10-2013-0053935 A | 5/2013 |

(Continued)

*Primary Examiner* — Chris Parry
*Assistant Examiner* — Stephen J Houlihan
(74) *Attorney, Agent, or Firm* — Jefferson IP Law, LLP

(57) ABSTRACT

According to an embodiment the electronic device comprising a communication module, a memory configured to store contents and device information on a first external electronic device, and a processor configured to control to identify a communication mode between the electronic device and the first external electronic device, the communication mode being determined based on at least one of information on some contents selected from the contents or the device information, transmit at least part of the selected contents to a second external electronic device using the communication module based on the communication mode being a first communication mode, and transmit the at least partial contents to the first external electronic device using the communication module based on the communication mode being a second communication mode.

11 Claims, 17 Drawing Sheets

(51) Int. Cl.
*G06Q 50/10* (2012.01)
*H04L 29/06* (2006.01)

(56) References Cited

U.S. PATENT DOCUMENTS

2016/0119418 A1  4/2016  Cho
2016/0330251 A1  11/2016  Lee et al.
2017/0085633 A1* 3/2017  Kim ........................ H04L 45/22

FOREIGN PATENT DOCUMENTS

KR        10-1602760 B1    3/2016
KR     10-2016-0047252 A    5/2016
KR        10-1670984 B1   10/2016

* cited by examiner

SYSTEM FOR SHARING CONTENT BETWEEN ELECTRONIC DEVICES, AND CONTENT SHARING METHOD FOR ELECTRONIC DEVICE

TECHNICAL FIELD

The disclosure relates to an inter-electronic device content sharing system and a content sharing method of an electronic device.

BACKGROUND ART

As content service methods advance in line with the development of wireless Internet services, it is becoming a trend to design electronic devices to share, rather than to store, content to play. Recently, interest has been increasing in the internet-of-things (IoT), which makes it possible for devices connected to a network to exchange information and provide a user with a service in a situation-adaptive manner. With the applicability of the IoT to various fields such as healthcare, smart home, agricultural and industrial environments and weather, and energy, user requirements on IoT service environments are becoming increasingly demanding.

DISCLOSURE OF INVENTION

Technical Problem

In order to share content, transfer of contents to be shared by an electronic device to a target device through direct communication, transfer of screen information of the contents to be shared by the electronic device to the target device (e.g., content mirroring), provision by the electronic device to the target device of unified resource locator (URL) information such that the target device displays the contents based on the URL information of the contents (e.g., Chromecast), or transfer of the contents by the electronic device to the target device via an intra-network to which the electronic devices are connected (e.g., digital living network alliance (DLNA)) may be considered.

In the above methods, however, the devices should be located within a short communication distance and fulfil requirements for use in the same network range for transferring the contents or content information from one device to another. If it is necessary to configure a mode for sharing contents through inter-device communication and request for sharing the contents according to the configured mode and playing the shared contents, such communication mode determination and connection establishment may result in cumbersome procedures.

Various embodiments of the disclosure propose methods and systems that are capable of allowing an electronic device to identify a communication mode for use in transmitting contents to be shared with a target device and controlling the electronic device to share the contents based on the identified communication mode.

Solution to Problem

According to an embodiment the electronic device comprising a communication module, a memory configured to store contents and device information on a first external electronic device, and a processor configured to control to identify a communication mode between the electronic device and the first external electronic device, the communication mode being determined based on at least one of information on some contents selected from the contents or the device information, transmit at least part of the selected contents to a second external electronic device using the communication module based on the communication mode being a first communication mode, and transmit the at least partial contents to the first external electronic device using the communication module based on the communication mode being a second communication mode.

According to an embodiment a content sharing method of an electronic device, the method comprising checking for contents to be shared and a first external electronic device to which content sharing is to be requested for in response to a content sharing request identifying a communication mode between the electronic device and the first external electronic device, the communication mode being determined based on at least one of content information, electronic device information, or information on the first external electronic device transmitting at least partial contents of the contents to a second external electronic device using a communication module of the electronic device based on the communication mode being a first communication mode, and transmitting the at least partial contents of the contents to the first external electronic device using the communication module of the electronic device based on the communication mode being a second communication mode.

Advantageous Effects of Invention

Various embodiments of the disclosure are advantageous in terms of improving convenience by determining a communication mode for use in sharing contents between electronic devices in a content-specific requesting manner and sharing the contents in the determined communication mode.

MODE FOR THE INVENTION

Figure 1:
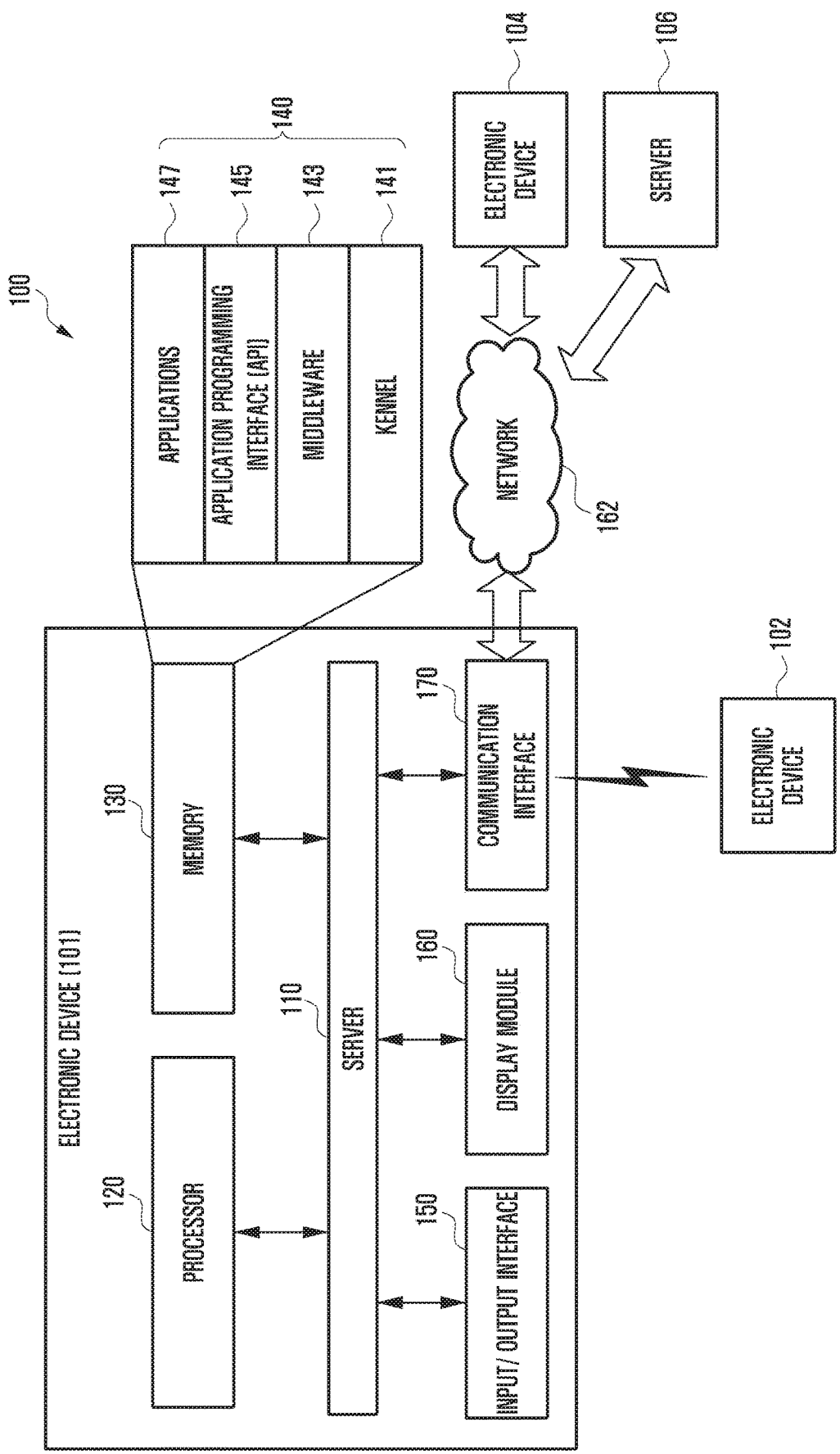
FIG. 1 illustrates a network environment 100 including an electronic device 101 according to various embodiments.

Hereinafter, the present disclosure will be described with reference to the accompanying drawings. Although specific embodiments are illustrated in the drawings and related detailed descriptions are discussed in the present disclosure, the present disclosure may have various modifications and several embodiments. However, various embodiments of the present disclosure are not limited to a specific implementation form and it should be understood that the present disclosure includes all changes and/or equivalents and substitutes included in the spirit and scope of various embodiments of the present disclosure. In connection with descriptions of the drawings, similar components are designated by the same reference numeral. In the present disclosure, the expression "and/or" includes any and all combinations of the associated listed words. For example, the expression "A and/or B" may include A, may include B, or may include both A and B. In the present disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first user device and a second user device indicate different user devices, although both are user devices. As a further example, a first element could be termed a second element and, similarly, a second element could also be termed a first element without departing from the scope of the present disclosure.

In the following description, the expression "configured to ~" may be interchangeably used with the expressions "suitable for ~", "having a capability of ~", "changed to ~", "made to ~", "capable of ~", and "designed for" in hardware or software. The expression "device configured to ~" may denote that the device is "capable of ~" with other devices or components. For example, when it is mentioned that a processor is configured to perform A, B, and C, it may be understood that the processor (e.g., CPU and application processor) is capable of performing corresponding operations by executing software programs dedicated to the corresponding operations.

The electronic device corresponds to at least one of a smartphone, a tablet personal computer (PC), a mobile phone, a video phone, an e-book reader, a desktop PC, a laptop PC, a netbook computer, a personal digital assistant (PDA), a portable multimedia player (PMP), a digital audio player (e.g., Moving Picture Experts Group phase 1 or phase 2 (MPEG-1 or MPEG-2) audio layer 3 (MP3) player), a mobile medical device, a camera, or a wearable device. Examples of the wearable device include at least one of an accessory type device (e.g., a head-mounted-device (HMD) (e.g., electronic eyeglasses), an electronic bracelet, an electronic necklace, an electronic appcessory, a smart watch, an electronic contact lens, an electronic glass) a piece of electronic clothing, a body-attached type device (e.g., an electronic tattoo, skin pad), or a bio-implantable device. The electronic device according to the various embodiments of the present disclosure may also be a smart home appliance. Examples of the smart home appliances include at least one of a television (TV), a digital video versatile disc (DVD) player, an audio system, a refrigerator, an air-conditioner, a cleaning device, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, an electronic album, or the like.

The electronic device according to the various embodiments of the present disclosure may also include at least one of medical devices (e.g., magnetic resonance angiography (MRA) device, magnetic resonance imaging (MRI) device, computed tomography (CT) device, a scanning machine, an ultrasonic scanning device, and the like), a navigation device, a global positioning system (GPS) receiver, an event data recorder (EDR), a flight data recorder (FDR), a vehicle infotainment device, electronic equipment for ships (e.g., navigation equipment, gyrocompass, and the like), avionics, a security device, a head unit for vehicles, an industrial or home robot, an automated teller machine (ATM), a point of sales (POS) system, or IoT(Internet of Things) device or the like. The electronic device according to the various embodiments of the present disclosure may also include furniture or a portion of a building/structure, an electronic board, an electronic signature receiving device, a projector, various measuring instruments (e.g., a water meter, an electric meter, a gas meter, and a wave meter) and the like. The electronic device according to the various embodiments of the present disclosure may also include a combination of the devices listed above. In addition, the electronic device according to the various embodiments of the present disclosure may be a flexible and/or contoured device. It should be obvious to those skilled in the art that the electronic device according to the various embodiments of the present disclosure is not limited to the aforementioned devices. Hereinafter, electronic devices according to various embodiments of the present disclosure will be described in detail with reference to the accompanying drawings. In the description, the term a "user" may refer to a person or a device that uses or otherwise controls the electronic device, e.g., an artificial intelligent electronic device.

FIG. 1 illustrates a network environment 100 including an electronic device 101 according to various embodiments.

With reference to FIG. 1, the electronic device 101 may include a bus 110, a processor 120, a memory 130, an input/output interface 150, a display 160, and a communication interface 170. According to an embodiment, the electronic device 101 may omit at least one of the aforementioned components or further include at least one other component. The bus 110 may be a circuit connecting the above described components and transmitting communications (for example, a control message or a message) between the above described components. The processor 120 may include at least one of a central processing unit (CPU), an application processor (AP), and a communication processor (CP). The processor 120 may receive commands from the other components through the bus 110, analyze the received commands, and execute calculation or data processing according to the analyzed commands. The processor 120 may control the above described components (e.g., the memory 130, the input/output interface 150, the display 160, or the communication interface 170) and execute calculation or data processing.

The memory 130 may store commands or data received from or generated by at least one other component (e.g., the input/output interface 140, the display 160, or the communication interface 170) or generated by the processor 120. The memory 130 may store software or program 140. The program 140 may include for example, a kernel 141, middleware 143, an Application Programming Interface (API) 145, or an application 147. At least part of the kernel 141, the middleware 143, or the API 145 may be referred to as an operating system. The kernel 131 may control or manage system resources (for example, the bus 110, the processor 120, or the memory 130) used for executing an operation or function implemented by the remaining other programming modules, for example, the middleware 133, the API 145, or the application 147. Further, the kernel 131 may provide an interface for controlling or managing the system resources by accessing individual components of the electronic device 101 from the middleware 143, the API 145, or the application 147

The middleware 143 may perform a relay function of allowing the API 145 or the application 147 to communicate with the kernel 131 to exchange data. Further, in operation requests received from the application 147, the middleware 143 performs a control for the operation requests (for example, scheduling or load balancing) by using a method of assigning a priority, by which system resources (for example, the bus 110, the processor 120, the memory 130, and the like) of the electronic device 101 can be used, to the application 147. The API 145 is an interface by which the application 147 can control a function provided by the kernel 141 or the middleware 143 and may include, for example, at least one interface or function (for example, command) for a file control, a window control, image processing, or a character control. The input/output interface 150 may receive a command or data as input from a user via an input/output apparatus, such as a sensor, keyboard, or touchscreen, and may deliver the received command or data to the processor 120 or the memory 130 through the bus 110.

The display 160 may include a liquid crystal display (LCD) and an active matrix organic light emitting diode (AM-OLED) display, microelectromechanical systems (MEMS), or an electronic paper display. The display 160 may display contents (e.g., text, image, video, icon or symbol) to the user. The display 160 may include a touchscreen that is capable of receiving a touch input, a gesture input, a proximity input, or a hovering input made with an electronic pen or part of the user's body by way of example. The communication interface 160 may connect communication between the electronic device 101 and the external device (for example, electronic device 104 or server 106). For example, the communication interface 160 may access a network 162 through wireless or wired communication to communicate with the external device.

The wireless communication may include at least one of, for example, Wi-Fi, BlueTooth (BT), Near Field Communication (NFC), a Global Positioning System (GPS), and cellular communication (for example, LTE, LTE-A, CDMA, WCDMA, UMTS, WiBro or GSM). The wired communication may include at least one of, for example, a Universal Serial Bus (USB), a High Definition Multimedia Interface (HDMI), Recommended Standard 232 (RS-232), and a Plain Old Telephone Service (POTS). The wireless communication may include a global navigation satellite system (GNSS). The GNSS may include at least one of, for example, a global positioning system (GPS), a global navigation satellite system (Glonass), a navigation satellite system (Beidou), and a European global satellite-based navigation system (Galileo), according to a use area, a bandwidth, or the like. In the following description, the terms "GPS" and "GNSS" may be interchangeably used. According to an embodiment, the network 162 may be a telecommunication network. The telecommunication network may include at least one of a computer network, Internet, Internet of things, and a telephone network.

Each of the first and second external electronic devices 102 and 104 may be identical to or different from the electronic device 101 in type. According to various embodiments, all or part of the operations being executed at the electronic device 101 may be executed at one or more other electronic devices (e.g., electronic devices 102 and 104 and server 106). According to an embodiment, if it is necessary for the electronic device 101 to execute a function or service automatically or in response to a request, the electronic device 101 may request to another device (e.g., electronic devices 102 and 104 and server 106) for executing at least part of related functions on its behalf or additionally. The other electronic device (e.g., electronic devices 102 and 104 and server 106) may execute the requested function or additional function and notify the electronic device 101 of the execution result. The electronic device 101 may provide the requested function or service with the execution result without any modification or after performing additional processing thereon. In order to accomplish this, it may be possible to use cloud computing, distributed computing, or client-server computing technology.

According to various embodiments, the electronic device 101 may share contents with the server 106 or another electronic device 104. The electronic device 101 may control such that the another electronic device plays the shared contents. For example, in the case of controlling to display on an indoor TV content that is in playback on a smartphone, it may be possible to control the smartphone to transmit a stored video to the TV device or control the TV device to play the video based on corresponding video information.

According to an embodiment, the electronic device 101 may share the contents with another electronic device (e.g., electronic devices 102 and 104 and server 106) via various content sharing modes. The content sharing may be achieved in such a way that a second electronic device displays the same screen as the content playback screen of a first electronic device (e.g., content mirroring), that the first electronic device provides the second electronic device with information on the contents in playback (e.g., content URL information and metadata) on the first electronic device in order for the second device to play the contents based on the content information (e.g., content casting), or that the first electronic device transmits the contents to the second electronic device directly in order for the second device to play the received contents (e.g., content sharing).

Figure 2:
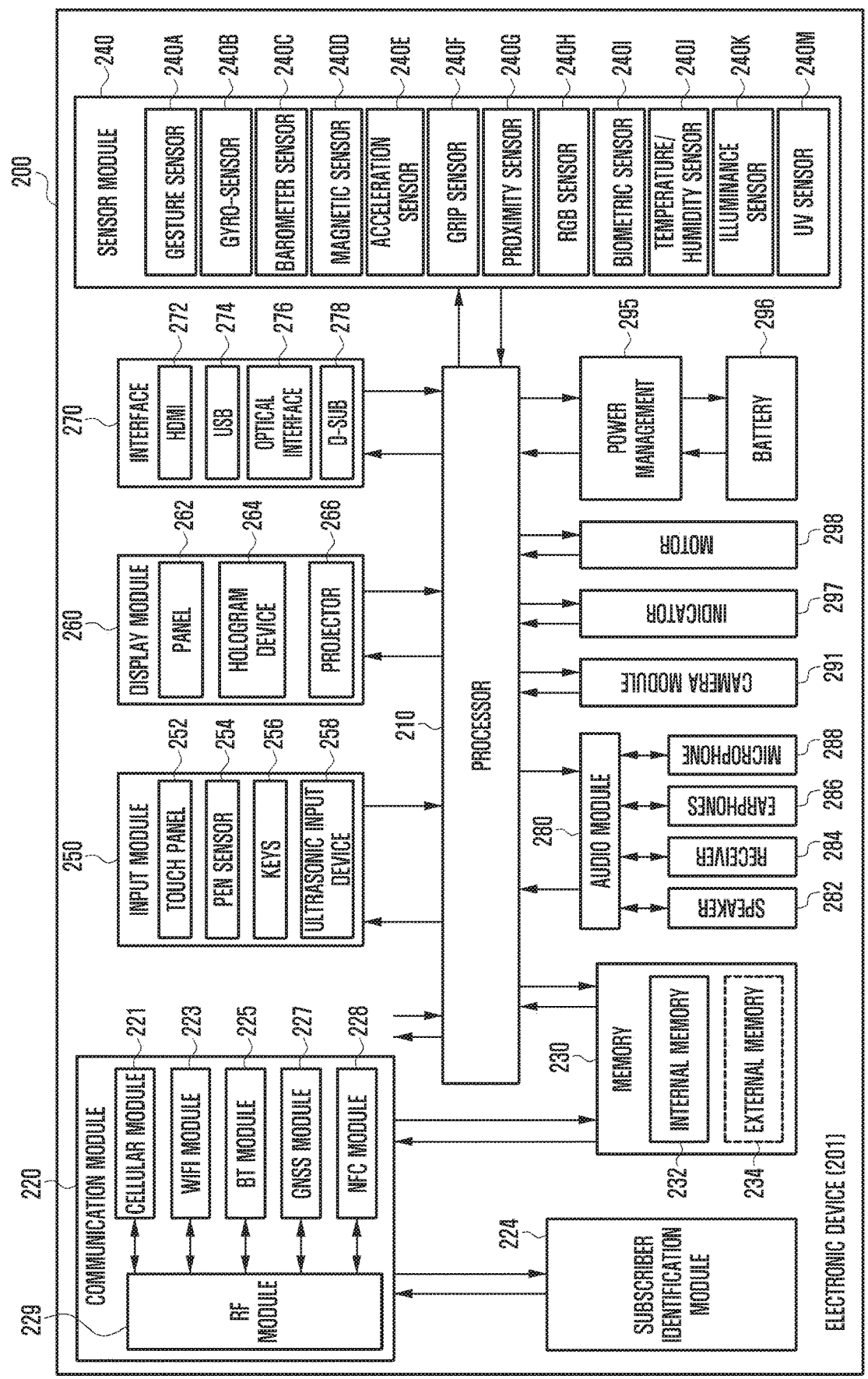
FIG. 2 is a block diagram of an electronic device 201 according to various embodiments.

FIG. 2 is a block diagram of an electronic device 201 according to various embodiments. The electronic device 201 may configure, for example, a whole or a part of the electronic device 101 illustrated in FIG. 1.

Referring to FIG. 2, the electronic device 201 may include one or more processors 210, a communication module 220, a Subscriber Identification Module (SIM) card 224, a memory 230, a sensor module 240, an input device 250, a display 260, an interface 270, an audio module 280, a camera module 291, a power managing module 295, a battery 296, an indicator 297, and a motor 298. The processor 210, for example Application Processors (APs), operates an operation system or an application program so as to control a plurality of hardware or software component elements connected to the processor 210 and execute various data processing operations and calculations including those for multimedia data. The processor 210 may be implemented by, for example, a System on Chip (SoC). According to an embodiment, the processor 210 may further include a Graphic Processing Unit (GPU). The processor 210 may include at least part (e.g., cellular module 221) of the components depicted in FIG. 2. The processor 210 may load and process a command or data received from at least one (e.g., non-volatile memory) of other components on a volatile memory and store result data in the non-volatile memory.

The communication module 220 (for example, communication interface 160) may transmit/receive data in communication between different electronic devices (for example, the electronic device 104 and the server 106) connected to the electronic device 201 (for example, electronic device 101) through a network. According to an embodiment, the communication module 220 may include a cellular module 221, a WiFi module 223, a BlueTooth (BT) module 225, a Global Positioning System (GPS) module 227, a Near Field Communication (NFC) module 228, and a Radio Frequency (RF) module 229. The cellular module 221 may provide a voice, a call, a video call, a Short Message Service (SMS), or an Internet service through a communication network (for example, Long Term Evolution (LTE), LTE-A, Code Division Multiple Access (CDMA), Wideband CDMA (WCDMA), UMTS, WiBro, GSM or the like). Further, the cellular module 221 may distinguish and authenticate electronic devices within a communication network by using a subscriber identification module (for example, the SIM card 224). According to an embodiment, the cellular module 221 may perform at least some of the functions that can be provided by the processor 210. For example, the cellular module 221 may perform at least some of the multimedia control functions According to an embodiment, the cellular module 221 may include a Communication Processor (CP). For example, at least some (for example, the communication processor corresponding to the cellular module 221 and the WiFi processor corresponding to the WiFi module 223) of the processors corresponding to the cellular module 225, the WiFi module 227, the BT module 228, the GPS module 221, and the NFC module 223 may be implemented by one SoC. The RF module 229 may transmit/receive data, for example, an RF signal. Although not illustrated, the RF module 229 may include, for example, a transceiver, a Power Amp Module (PAM), a frequency filter, a Low Noise Amplifier (LNA), or the like. Further, the RF module 229 may further include a component for transmitting/receiving electronic waves over a free air space in wireless communication, for example, a conductor, a conducting wire, or the like. Although the cellular module 221, the WiFi module 223, the BT module 225, the GPS module 227, and the NFC module 228 share one RF module 229 in FIG. 2, at least one of the cellular module 221, the WiFi module 223, the BT module 225, the GPS module 227, and the NFC module 228 may transmit/receive an RF signal through a separate RF module according to one embodiment. The SIM card 224 may be a card including a subscriber identification module and may be inserted into a slot formed in a particular portion of the electronic device. The SIM card 224 may include unique identification information (for example, Integrated Circuit Card IDentifier (ICCID)) or subscriber information (for example, International Mobile Subscriber Identity (IMSI).

The memory 230 (for example, memory 130) may include an internal memory 232 or an external memory 234. The internal memory 232 may include, for example, at least one of a volatile memory (for example, a dynamic RAM (DRAM), a static RAM (SRAM), a synchronous dynamic RAM (SDRAM), and the like), and a non-volatile Memory (for example, a one time programmable ROM (OTPROM), a programmable ROM (PROM), an erasable and programmable ROM (EPROM), an electrically erasable and programmable ROM (EEPROM), a mask ROM, a flash ROM, a NAND flash memory, an NOR flash memory, and the like). According to an embodiment, the internal memory 232 may be a Solid State Drive (SSD). The external memory 234 may further include a flash drive, for example, a Compact Flash (CF), a Secure Digital (SD), a Micro Secure Digital (Micro-SD), a Mini Secure Digital (Mini-SD), an extreme Digital (xD), or a memory stick. The external memory 234 may be functionally connected to the electronic device 201 through various interfaces. According to an embodiment, the electronic device 201 may further include a storage device (or storage medium) such as a hard drive.

The sensor module 240 may measure a physical quantity or detect an operation state of the electronic device 201, and convert the measured or detected information to an electronic signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, Red, Green, and Blue (RGB) sensor) 240H, a biometric sensor 240I, a temperature/humidity sensor 240J, an illumination sensor 240K, and a Ultra Violet (UV) sensor 240M. Additionally or alternatively, the sensor module 240 may include, for example, an E-nose sensor (not illustrated), an electromyography (EMG) sensor (not illustrated), an electroencephalogram (EEG) sensor (not illustrated), an electrocardiogram (ECG) sensor (not illustrated), an Infra-Red (IR) sensor (not illustrated), an iris sensor (not illustrated), a fingerprint sensor (not illustrated), and the like. The sensor module 240 may further include a control circuit for controlling one or more sensors included in the sensor module 240. According to an embodiment, the electronic device 201 may further include a processor as part of or separate from the processor 201 for controlling the sensor module 240 while the processor 210 is in a sleep state.

The input device 250 may include a touch panel 252, a (digital) pen sensor 254, a key 256, or an ultrasonic input device 258. For example, the touch panel 252 may recognize a touch input in at least one type of a capacitive type, a resistive type, an infrared type, and an acoustic wave type. The touch panel 252 may further include a control circuit. In the capacitive type, the touch panel 252 can recognize proximity as well as a direct touch. The touch panel 252 may further include a tactile layer. In this event, the touch panel 252 may provide a tactile reaction to the user. The (digital) pen sensor 254 may be implemented by, for example, using a method identical or similar to a method of receiving a touch input of the user, or using a separate recognition sheet. The key 256 may include, for example, a physical button, an optical key, or a key pad. The ultrasonic input device 258 is a device that can detect an acoustic wave by a microphone (for example, microphone 288) of the electronic device 201 through an input means generating an ultrasonic signal to identify data and can perform wireless recognition.

The display 260 (for example, display 150) may include a panel 262, a hologram device 264, or a projector 266. The panel 262 may be, for example, a Liquid Crystal Display (LCD) or an Active Matrix Organic Light Emitting Diode (AM-OLED). The panel 262 may be implemented to be, for example, flexible, transparent, or wearable. The panel 262 may be configured by the touch panel 252 and one module. The hologram device 264 may show a stereoscopic image in the air by using interference of light. The projector 266 may project light on a screen to display an image. For example, the screen may be located inside or outside the electronic device 201. The interface 270 may include, for example, a High-Definition Multimedia Interface (HDMI) 272, a Universal Serial Bus (USB) 274, an optical interface 276, or a D-subminiature (D-sub) 278. The interface 270 may be included in, for example, the communication interface 160 illustrated in FIG. 1. Additionally or alternatively, the interface 290 may include, for example, a Mobile High-definition Link (*MHL*) interface, a Secure Digital (SD) card/Multi-Media Card (MMC) (not shown), or an Infrared Data Association (IrDA) standard interface.

The audio module 280 may bi-directionally convert a sound and an electronic signal. At least some components of the audio module 280 may be included in, for example, the input/output interface 140 illustrated in FIG. 1. The audio module 280 may process sound information input or output through, for example, a speaker 282, a receiver 284, an earphone 286, the microphone 288, or the like. The camera module 291 is a device that can photograph a still image and a video. According to an embodiment, the camera module 291 may include one or more image sensors (for example, a front sensor or a back sensor), an Image Signal Processor (ISP) (not shown), or a flash (not shown) (for example, LED or xenon lamp). The power managing module 295 may manage power of the electronic device 201. Although not illustrated, the power managing module 295 may include, for example, a Power Management Integrated Circuit (PMIC), a charger Integrated Circuit (IC), or a battery or fuel gauge. The power managing module 295 may manage power of the electronic device 201. Although not illustrated, the power managing module 295 may include, for example, a Power Management Integrated Circuit (PMIC), a charger Integrated Circuit (IC), or a battery or fuel gauge. The battery fuel gauge may measure, for example, a remaining quantity of the battery 296, or a voltage, a current, or a temperature during the charging. The battery 296 may store or generate electricity and supply power to the electronic device 201 by using the stored or generated electricity. The battery 296 may include a rechargeable battery or a solar battery.

The indicator 297 may show particular statuses of the electronic device 201 or a part (for example, AP 210) of the hardware, for example, a booting status, a message status, a charging status, and the like. The motor 298 may convert an electrical signal to a mechanical vibration. Although not illustrated, the electronic device 201 may include a processing unit (for example, GPU) for supporting a mobileTV. The processing unit for supporting the mobile TV may process, for example, media data according to a standard of Digital Multimedia Broadcasting (DMB), Digital Video Broadcasting (DVB), media flow, or the like. Each of the components of the electronic device according to various embodiments of the present disclosure may be implemented by one or more components and the name of the corresponding component may vary depending on a type of the electronic device. The electronic device according to various embodiments of the present disclosure may include at least one of the above described components, a few of the components may be omitted, or an additional component may be further included. Also, some of the components of the electronic device according to various embodiments of the present disclosure may be combined to form a single entity; thus, they may equivalently execute functions of the corresponding components before being combined.

Figure 3:
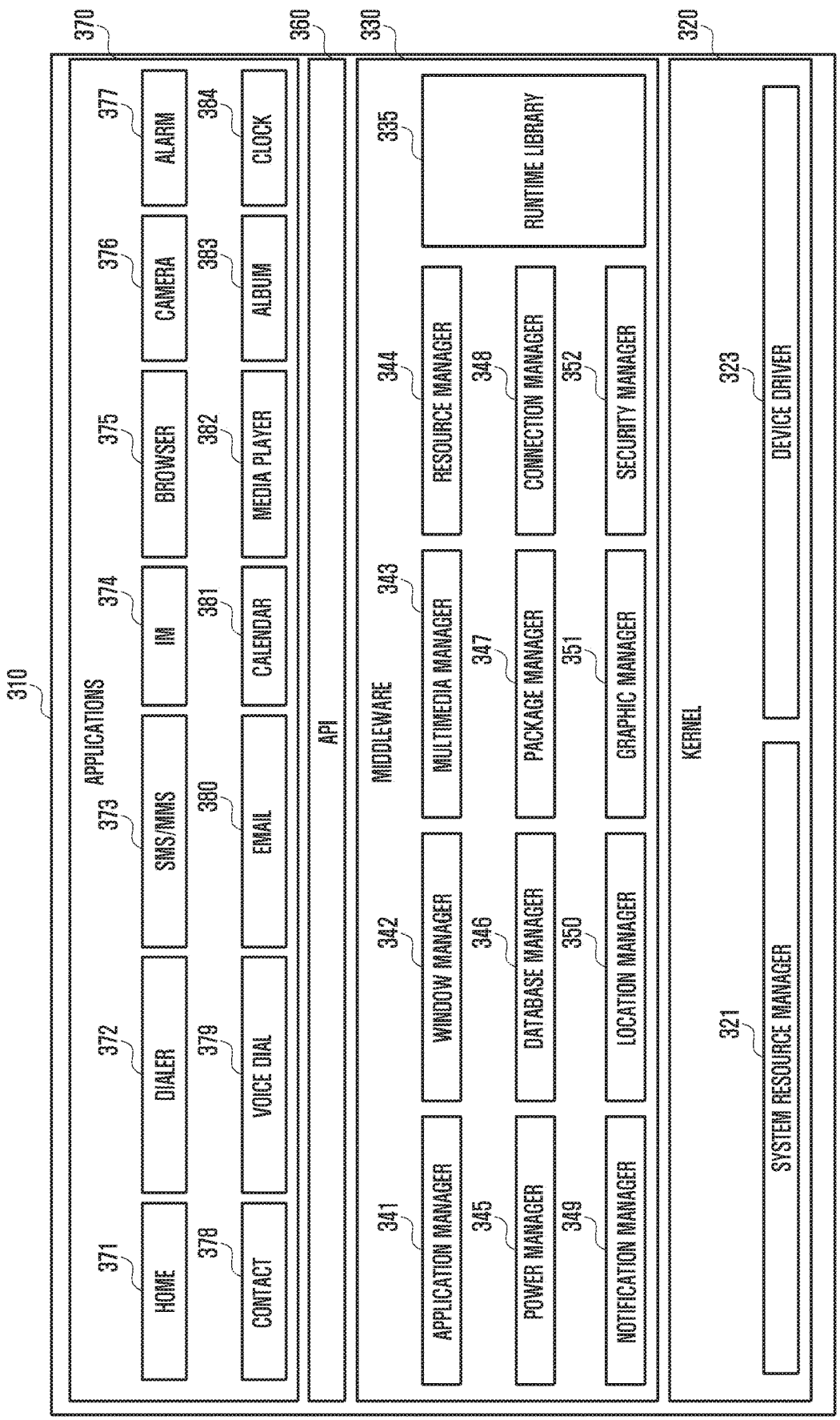
FIG. 3 is a block diagram illustrating a program module according to various embodiments.

FIG. 3 is a block diagram illustrating a program module according to various embodiments.

In the embodiment of FIG. 3, the program module 310 (e.g., program 140) may include an operating system for controlling the resources of the electronic device (e.g. electronic device 101) and various applications (e.g., application program 147) running on the operating system. The operating system may include Android™, iOS™, Windows™, Symbian™, Tizen™, and Bada™ by way of example. In reference to FIG. 3, the program module 310 may include a kennel 320 (e.g., kernel 141), a middleware 330 (e.g., middleware 143), an API 360 (e.g., API 145), and an application 370 (e.g., application 147). At least part of the program module 310 may be pre-loaded on the electronic device or downloaded from an external electronic device (e.g., electronic devices 102 and 104).

The kernel 310 may include a system resource manager 321 or a device driver 322. The system resource manager 321 may include, for example, a process manager, a memory manager, or a file system manager. The system resource manager 321 may perform a system resource control, allocation, or recall. The device driver 323 may include, for example, a display driver, a camera driver, a Bluetooth driver, a shared memory driver, a USB driver, a keypad driver, a WiFi driver, or an audio driver. Further, according to an embodiment, the device driver 312 may include an Inter-Process Communication (IPC) driver (not shown). The middleware 330 may include a plurality of modules prepared in advance to provide a function required in common by the applications 370. Further, the middleware 330 may provide a function through the API 360 to allow the application 370 to efficiently use limited system resources within the electronic device. For example, as illustrated in FIG. 3, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module used by a complier to add a new function through a programming language while the application 370 is executed. According to an embodiment, the runtime library 335 may execute input and output, management of a memory, a function associated with an arithmetic function, or the like. The application manager 341 may manage, for example, a life cycle of at least one of the applications 370. The window manager 342 may manage GUI resources used on the screen. The multimedia manager 343 may detect a format required for reproducing various media files and perform an encoding or a decoding of a media file by using a codec suitable for the corresponding format. The resource manager 344 may manage resources such as a source code, a memory, or a storage space of at least one of the applications 370. The power manager 345 may operate together with a Basic Input/Output System (BIOS) to manage a battery or power and provide power information required for the operation. The database manager 346 may manage generation, search, or change of a database to be used by at least one of the applications 370. The package manager 347 may manage an installation or an update of an application distributed in a form of a package file.

The connectivity manager 348 may manage, for example, a wireless connection such as WiFi or Bluetooth. The notification manager 349 may display or notify a user of an event such as an arrival message, an appointment, a proximity alarm or the like, in a manner that does not disturb the user. The location manager 350 may manage location information of the electronic device. The graphic manager 351 may manage a graphic effect provided to the user or a user interface related to the graphic effect. The security manager 352 may provide a general security function required for a system security or a user authentication. According to an embodiment, when the electronic device (for example, electronic device 100) has a call function, the middleware 330 may further include a telephony manager (not shown) for managing a voice of the electronic device or a video call function. According to an embodiment, when the electronic device (for example, electronic device 100) has a call function, the middleware 330 may further include a telephony manager (not shown) for managing a voice of the electronic device or a video call function. The middleware 330 may generate a new middleware module through a combination of various functions of the aforementioned internal component modules and use the generated new middleware module. The middleware 330 may provide a module specified for each type of operating system to provide a differentiated function. Further, the middleware 330 may dynamically delete some of the conventional components or add new components. Accordingly, some of the components described in the embodiment of the present disclosure may be omitted, replaced with other components having different names but performing similar functions, or other components may be further included. The API 360 (for example, API 133) is a set of API programming functions, and it may be provided with a different configuration according to an operating system. For example, in Android or iOS, a single API set may be provided for each platform. In Tizen, two or more API sets may be provided.

The applications 370 may include a home 371, a dialer 372, an SMS/MMS 373, an instant message (IM) 374, a browser 375, a camera 376, an alarm 377, a contact 378, a voice dial 379, an email 380, a calendar 381, a media player 382, an album 383, a watch 384, a health care (e.g., measurement of workout amount and blood sugar), and an environmental information (e.g., atmospheric pressure, humidity, and temperature) provision application. The application module 134 may be an application related to exchanging information between the electronic device 101 and the external electronic devices (e.g., an electronic device 104). The information exchange-related application may include a notification relay application for transmitting specific information to an external electronic device or a device management application for managing external electronic devices. For example, the notification relay application may include a function for transmitting notification information, created by the other applications of the electronic device 101 (e.g., SMS/MMS application, email application, health care application, environment information application), to an external electronic device (e.g., electronic device 104). In addition, the notification relay application may receive notification information from an external electronic device (e.g., electronic device 104) and provide it to the user. The device management application can manage (e.g., install, delete, or update) part of the functions of an external electronic device (e.g., electronic device 104) communicating with the electronic device 101, e.g., turning on/off the external electronic device, turning on/off part of the components of the external electronic device, adjusting the brightness or the display resolution of the display of the external electronic device, the like; applications operated in the external electronic device or services from the external electronic device, e.g., call service or messaging service. According to an embodiment, the application 370 may include an application (e.g., healthcare application of a mobile medical device) designated according to the properties of the external electronic device. According to an embodiment, the applications 370 may include an application received from the external electronic device. At least part of the application module 310 may be implemented (e.g., executed) in the form of software, firmware, hardware, or a combination of at least two thereof and include a module, a program, a routine, a command set, or a process for performing at least one function.

Figure 4:
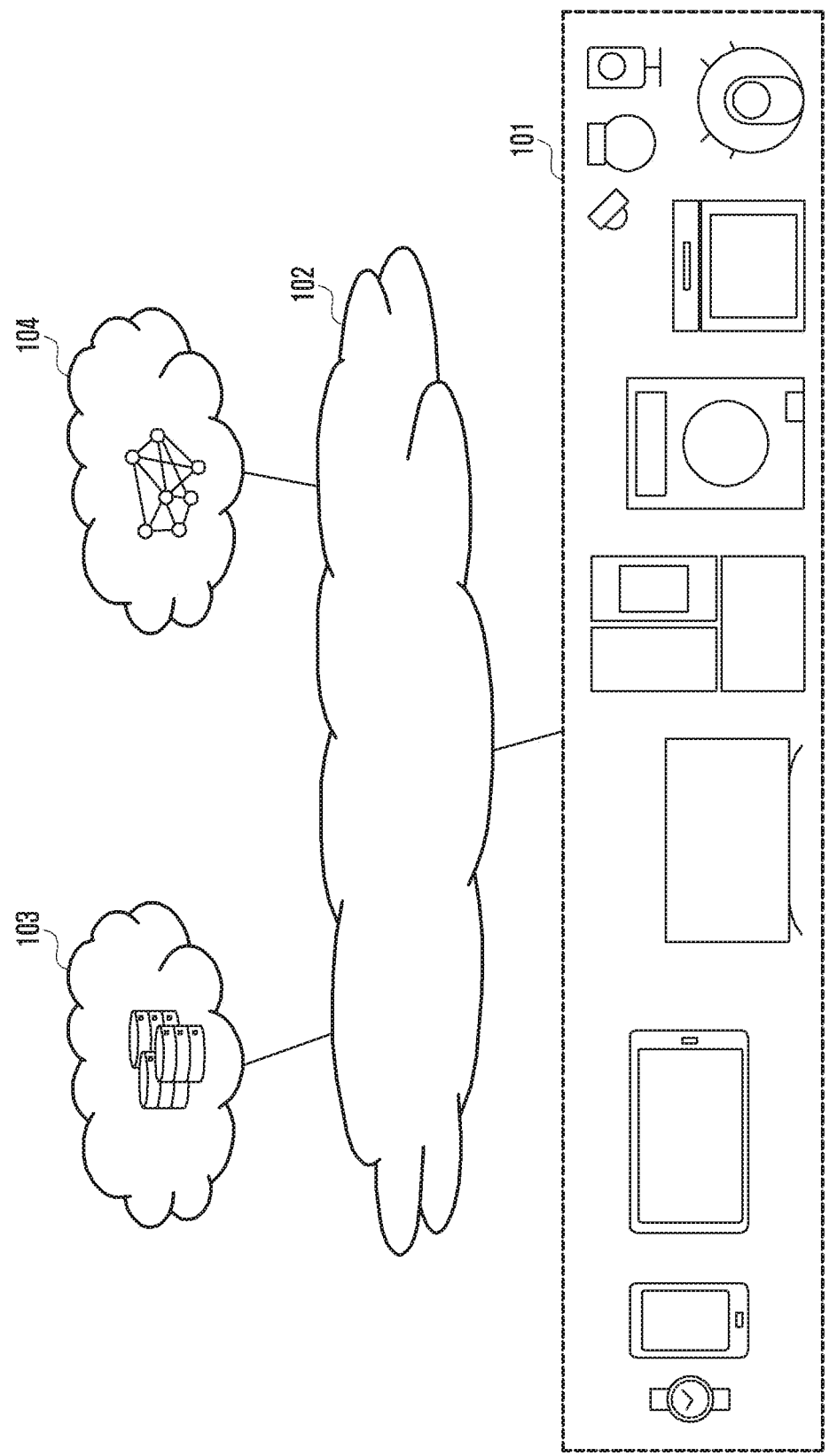
FIG. 4 is a diagram illustrating a content sharing system in a network environment according to various embodiments of the disclosure.

FIG. 4 is a diagram illustrating a content sharing system in a network environment according to various embodiments of the disclosure.

In reference to the embodiment of FIG. 4, at least one electronic device may connect to a cloud storage system 103 and to machine-to-machine communication system (e.g., internet of thing) 104 via a network 102.

According to various embodiments of the disclosure, the at least one electronic device 101 may include all electronic devices equipped with an electronic network connection function. For example, the at least one electronic device 101 may include, but is not limited to, a smartphone, a tablet computer, a wearable device, a smart TV, a smart refrigerator, a smart washing machine, a smart oven, a robot cleaner, a sensor, and a CCTV.

According to various embodiments of the disclosure, the electronic device 101 (e.g., electronic devices 101, 102, and 104 of FIG. 1 and electronic device 201 of FIG. 2) may perform at least one of generating contents, playing the contents, and transmitting the contents to another electronic device. The contents may include music, videos, images, documents, and voice files. The contents may be provided in the form of information copies rather than original files, e.g., information making it possible to identify and recognize the contents stored in another device or a cloud server such as thumbnails.

According to various embodiments of the disclosure, the electronic device 101 may receive at least one of the originals of contents from another electronic device or an external system, content resource access information for access from outside to the contents stored in the external system, and control information for controlling the contents or a uniform resource locator (URL) for the contents (e.g., playback and display). The content resource access information may be provided in the form of a unified resource identifier (URI) or a structured data format (e.g., extensible markup language (XML) and javaScript object notation (JSON) specifying a system access right and access method.

The electronic device 101 may control the contents according to the received control information. For example, the electronic device 101 may control, if the contents corresponding to targets to be shared or played by the electronic device 101 are music files, to output sounds or, if the contents are videos, to output images and sounds.

According to various embodiments, an operation for sharing contents between electronic devices may include exchanging sharing information between the electronic devices and playing the contents.

According to various embodiments of the disclosure, the electronic device 101 may communicate data with another electronic device or an external system for sharing contents using various communication methods. For example, the electronic device 101 may share contents with another electronic device using a direct communication method, an intra-system-based communication method, or an inter-system-based communication method. The direct communication method may use 1:1 direct communication between devices. The intra-system-based communication method may use an intra-network to which electronic devices are connected. The inter-system-based communication method may use a cloud storage system by way of example.

According to various embodiments of the disclosure, although the description is made under the assumption that the electronic device 101 operates in a role as at least one of an electronic device that selects contents and requests to another device for sharing the contents or a target device that receives a content sharing request from another electronic device, the role is not limited to operating as an one of the electronic devices requesting for content sharing or the target device receiving the content sharing request.

According to various embodiments of the disclosure, the network 102 may be the Internet. The electronic device 101 may connect to the network 102 using various network access methods. The electronic device may connect to the network through at least one of a cellular network (such as 3G, 4G, and 5G cellular networks), an Ethernet, a mesh network, or a short range wireless communication network.

According to various embodiments of the disclosure, the network access method of the electronic device 101 may vary according to its device type. For example, an electronic device such as a smartphone may support a connection via a cellular network, a wireless Ethernet, or a short range wireless communication network such as Bluetooth. By way of another example, an electronic device such as a TV may support a connection via a wireless/wireline Ethernet or a short range wireless communication network such as Bluetooth LE. The network 102 may include at least one of a bridge or a gateway for establishing network layer architecture or a heterogeneous network connection.

According to various embodiments of the disclosure, the cloud storage system 103 may be connected to at least one electronic device 101 via the network. The cloud storage system 103 may provide various service functions for uploading, downloading, and sharing contents through communication with the electronic device 101. According to an embodiment, the cloud storage system 103 may assign at least one storage space to the electronic device having a registered cloud service account. The electronic device 101 may access the storage space of the cloud storage system 103 to upload, download, and delete any contents.

According to various embodiments, the cloud storage system 103 may store the contents uploaded from the electronic device 101 and provide the electronic device with content resource access information for access from outside to the stored contents. The electronic device 101 may access the cloud storage system 103 to download the contents stored therein based on the received content resource access information.

According to various embodiments of the disclosure, the cloud storage system 103 may include a user data storage space for storing data of the electronic device 101 having a registered cloud service account and a shared data storage space for temporarily storing shared data. For example, the user data storage space may be accessible by only the electronic device having an access right to the user data storage space. The shared data storage space may be accessible based on the content resource access information for access from outside to data or contents shared between electronic devices.

According to various embodiments of the disclosure, the machine-to-machine communication system 104 may be connected via the network with at least one electronic device registered with the same user account information.

According to various embodiments of the disclosure, the machine-to-machine communication system 104 may recognize the at least one electronic device 101 connected to the machine-to-machine communication system 104 and control operations of the at least one electronic device. For example, the machine-to-machine communication system 104 may perform at least one of checking the at least one electronic device 101 for per-device status and capability and controlling the electronic device 101.

According to an embodiment of the disclosure, upon receipt of a content sharing request command from the at least one electronic device 101 connected to the machine-to-machine communication system 104, the machine-to-machine communication system 104 may, in reply, determine a communication method for use between the electronic device 101 and another electronic device (e.g., target device) for sharing the contents and provide the electronic devices participating in the content sharing with information on the determined communication method.

According to an embodiment of the disclosure, upon receipt of information on the target device for sharing the contents and content resource access information for allowing access to the space storing the contents from the at least one electronic device 101 connected to the machine-to-machine communication system, the machine-to-machine communication system 104 may transmit content resource access information or a content playback control instruction to the target devices registered with the machine-to-machine communication system 104.

Descriptions are made hereinafter of the configurations of the machine-to-machine communication system 104 and the cloud server system 103.

Figure 5:
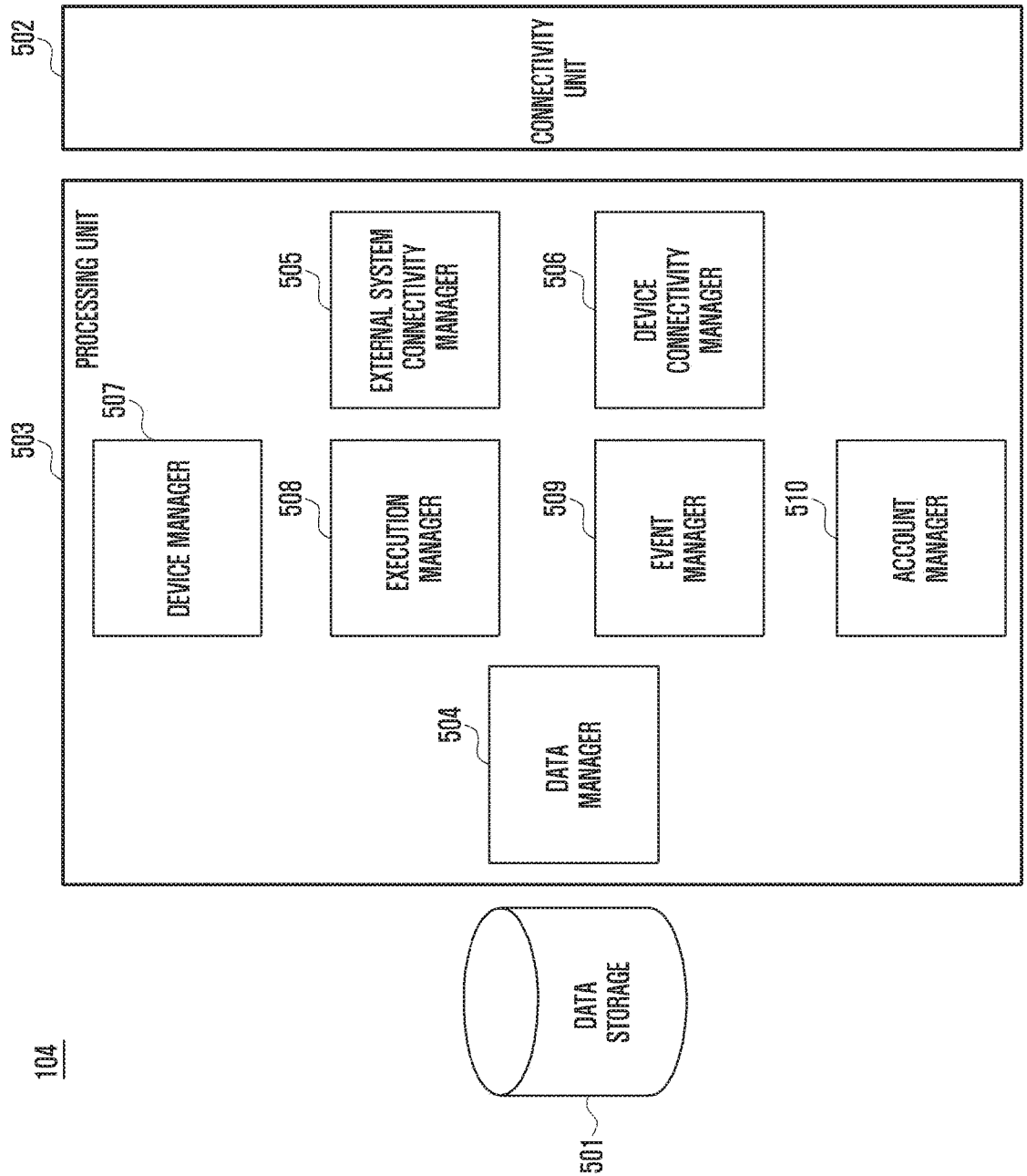
FIG. 5 is a block diagram illustrating a machine-to-machine communication system according to various embodiments of the disclosure.

FIG. 5 is a block diagram illustrating a machine-to-machine communication system according to various embodiments of the disclosure.

In the embodiment of FIG. 5, the machine-to-machine communication system 104 may include a data storage 501, a connectivity unit 502, and a processing unit 503.

According to an embodiment, the data storage 501 may store information on at least one electronic device connected to the machine-to-machine communication system 104, an instruction set for controlling the at least one electronic device, and information on an account of a user with an access right to the machine-to-machine communication system.

According to an embodiment, the electronic device information may include at least one of device identification information (e.g., device ID, manufacturer, serial number, and MAC), device capacity information indicating a capacity on the operations available in the device, device status information indicating a specific status value of the device, device instruction information indicating an instruction for controlling the device, device event information indicating events occurring in the device, device location information indicating the location of the device, and device operation information indicating device operation time and a number of operations.

According to an embodiment, the instruction set may be executed based on at least one of a user command or an internal/external event. The instruction set may include at least one of event information, condition information, or at least one instruction information.

For example, if a sensing device senses CO gas in a certain space, the machine-to-machine communication system 104 may receive a CO2 sensing event. The machine-to-machine communication system 104 may generate an emergency bell ringing instruction. The machine-to-machine communication system 104 may control a sound output of an emergency bell device. If it is detected by means of a sensing device on the entrance door that an entrance door opens at 5 o'clock in the evening, the machine-to-machine communication system 104 may receive an event occurring when the entrance door opens. In reply, the machine-to-machine communication system 104 may generate an instruction to a music playback device to play music or an instruction set to turn on an illumination system of a living room. In this manner, the machine-to-machine communication system 104 may control the music playback device or the illumination system.

According to an embodiment, the connectivity unit 502 of the machine-to-machine communication system may act as an interface for data communication with an electronic device or a system capable of being connected to the machine-to-machine communication system. The connectivity unit 502 may support various types of network interfaces. The connectivity unit may correspond to various types of communication protocols.

According to an embodiment, the processing unit 503 of the machine-to-machine communication system may control overall operations of the machine-to-machine communication system. The processing unit 503 of the machine-to-machine communication system may include at least one of a data manager 504, an external system connectivity manager 505, a device connectivity manager 506, a device manager 507, an execution manager 508, an event manager 509, or an account manager 510.

According to an embodiment, the data manager 504 may create, collect, store, modify, analyze, query, or delete data stored or to be stored in the data storage. The data manager 504 may generate a new instruction set through an analysis operation on the data stored in the data storage 501.

According to an embodiment, the external system connectivity manager 505 may manage a communication channel established with an external server or exchange data with the external server through the communication channel. For example, the external system connectivity manager 505 may operate in a host mode for a RESTful service for handling an information request from an external Internet service server. By way of another example, the external system connectivity manager 505 may operate in a client mode for the RESTful service to acquire information from the external Internet service server.

According to an embodiment, the device connectivity manager 506 may manage communication channels of the electronic devices connected to the machine-to-machine communication system 104 and perform data exchange through the communication channels.

According to an embodiment, the device manager 507 may perform at least one of registering, unregistering, status-querying, activating, or deactivating on electronic devices registered or to be registered with the machine-to-machine communication system 104.

According to an embodiment, the execution manager 508 may control the electronic device to process an execution command identified through the data storage 501. According to an alternative embodiment, the execution manager 508 may control the electronic device to process the execution command transmitted by another electronic device.

According to an embodiment, the event manager 509 may identify an event that occurs inside or outside the electronic device and query the instruction set stored in the data storage 501 via the data manager 504 to identify the corresponding instruction set. The event manager 509 may detect a status change event occurring in the electronic device and modify the electronic device's status information stored in the data storage via the data manager 504.

According to an embodiment, the account manager 510 may connect to the machine-to-machine communication system 104 based on the account information stored in the data storage and control access attempts of the devices registered with the machine-to-machine communication system 104. For example, the account manager 501 may control query/modification rights of a user to the whole machine-to-machine communication system or at least some devices.

According to an embodiment, the machine-to-machine communication system 104 may control various types of electronic devices, and include an intelligence engine (not shown) for managing/analyzing the electronic devices, relationships among the electronic devices, and electronic device use pattern information, or use an external intelligence engine.

According to an embodiment, the machine-to-machine communication system 104 may be provided in the form of an external server separated from the electronic device and a user's internal network. An IoT hub or an electronic device included in the user's internal network may be responsible for at least part of the functions of the machine-to-machine communication system 104. For example, the electronic device may include a machine-to-machine communication module supporting an operation function of the machine-to-machine communication system and perform the operations of the machine-to-machine communication system by means of the machine-to-machine communication module.

Figure 6:
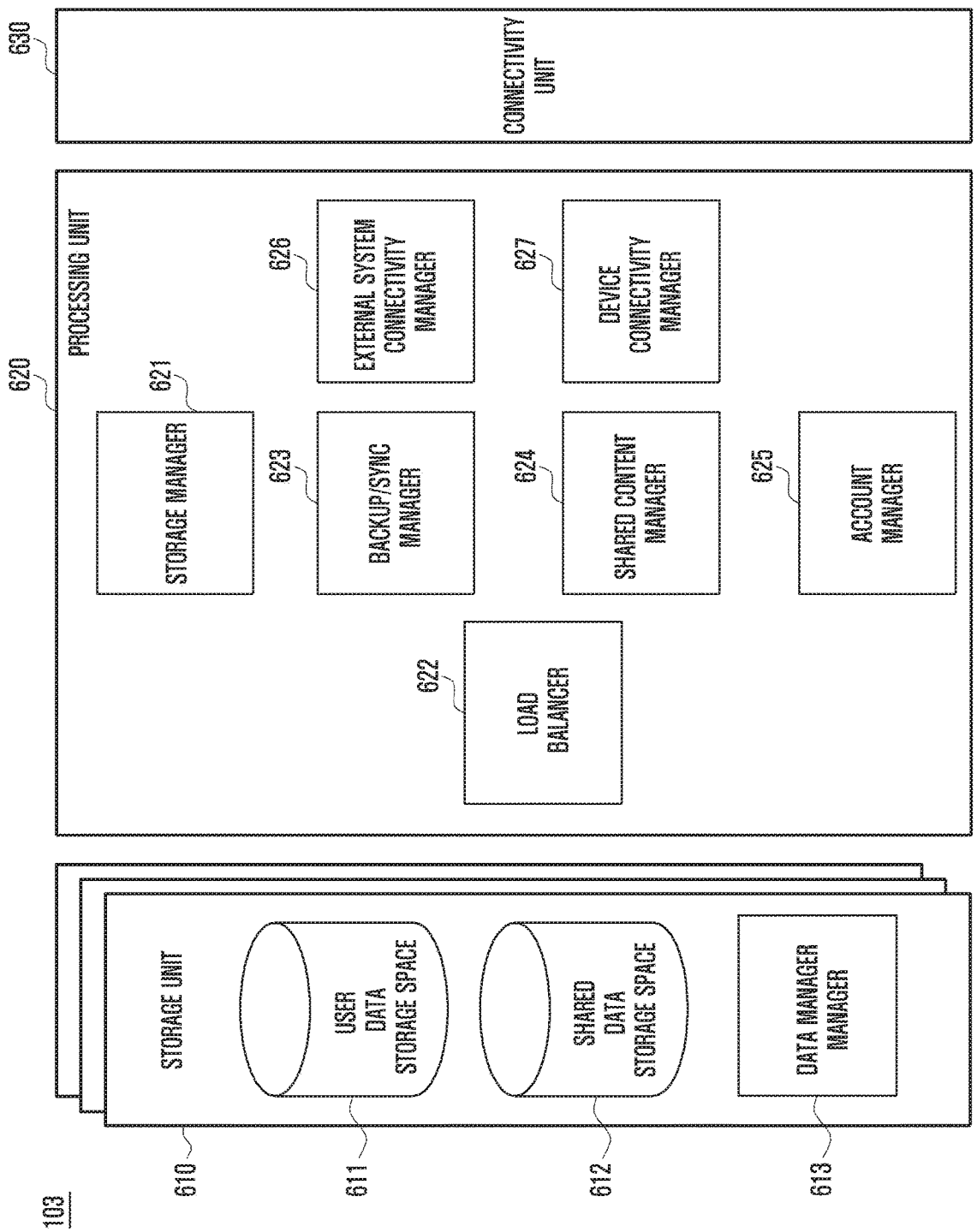
FIG. 6 is a diagram illustrating a cloud storage system according to an embodiment of the disclosure.

FIG. 6 is a diagram illustrating a cloud storage system according to an embodiment of the disclosure.

In the embodiment of FIG. 6, the cloud storage system 103 includes a storage unit 610, a processing unit 620, and a connectivity unit 630.

According to an embodiment, the storage unit 610 of the cloud storage system 103 may include at least one of a user data storage space 611, a shared data storage space 612, or a data manager 613.

According to an embodiment, the user data storage space 611 may store originals or copies of at least one user data received from an electronic device. The user data storage space 611 may be accessible by an electronic device to which an account manager has assigned an access right. For example, the electronic device with the access right may access the user data storage space 611 to upload, download, and delete contents.

For example, the user data may be at least one of raw data, information, or contents. Although a distinction is made among the raw data, information, and contents in view of usage, the user data are not limited in type or format. For example, the user data may include data created/transmitted by at least one electronic device, data created in the user data storage space, data modified/recreated based on at least one data stored in the user data storage space, and data transmitted from an external system.

According to an embodiment, the shared data storage space 612 may store at least one data. The user data stored in the shared data storage space 612 may be at least one of data created/acquired in at least one user device or data stored in the user data storage space. According to an embodiment, the data stored in the shared data storage space 612 may be accessible by another electronic device that is not granted a right based on externally accessible content resource access information (e.g., URI).

According to an embodiment of the disclosure, the user data stored in the shared data storage space 612 may be deleted from the shared data storage space 612 under a predetermined condition. The predetermined condition may be a time limit or a limited number of access times by way of example. According to an alternative embodiment, the shared data storage space 612 may be created at a time when the user data are stored. The shared data storage space 612 may be deleted under a predetermined condition. The predetermined condition of deleting the shared data storage space 612 may be a time limit or a limited number of access times by way of example.

According to an embodiment, the data manager 613 may store data in the user data storage space 611 or the shared data storage space 612. The data manager 613 may perform a management operation of querying, modifying, analyzing, or deleting the stored data. The data manager may manage analysis data (e.g., tags and properties of contents) acquired by analyzing the stored data along with the stored data.

According to an embodiment, the processing unit 620 of the cloud storage system may include at least one of a storage manager 621, a load balancer 622, a backup/synchronization (backup/sync) manager 623, a shared content manager 624, an account manager 625, an external system connectivity manager 626, or a device connectivity manager 627.

According to an embodiment, the storage manager 621 may process a control operation on at least one storage unit 610 included in the cloud storage system 103. The storage manager 621 may process a control operation of adding at least one storage unit to the cloud storage system 103, or deleting, activating, deactivating, access-controlling, or access-grating on the added storage unit. For example, if the account manager 625 grants a right to a new electronic device, the storage manager 621 may assign a new storage unit and configure a right about the new storage unit.

According to an embodiment, the load balancer 622 may perform an operation for distributing data input/output through the cloud storage system 103 to the at least one storage unit 610.

According to an embodiment, the backup/sync manager 623 may perform at least one of a function for storing data created/acquired in the electronic device in at least one of the user data storage space 611 or the shared data storage space 612 (e.g., backup function) or a function of applying any change in at least one of the data stored in the user device or the user data storage space 611 to other data (e.g., synchronization function).

According to an embodiment, the shared content manager 624 may create a copy of the at least one content in the shared data storage space 612 according to a content sharing instruction and generate content resource access information for the created contents. The shared content manager 624 may delete the copy of the user data stored in the shared data storage space 612 under a predetermined condition. The predetermined condition may be a time limit or a number of access times.

According to an embodiment, the account manager 625 may control access to the cloud store system 103 and the data stored in the user data storage space 611. For example, the account manager 625 may control to verify the access right of the electronic device to the user data storage space and allow for the verified electronic device to access the user data storage space.

According to an embodiment, the external system connectivity manager 626 may manage a communication channel established with an external server and perform an operation for data exchange through the communication channel. For example, the external system connectivity manager 626 may operate in a host mode for a RESTful service for handling an information request from an external Internet service server. By way of another example, the external system connectivity manager 626 may operate in a client mode for the RESTful service to acquire information from the external Internet service server.

According to an embodiment, the device connectivity manager 627 may manage communication channels of the electronic devices connected to the cloud storage system 103 and perform data exchange through the communication channels.

According to an embodiment, the connectivity unit 630 may act as an interface for data communication with an external device or a system. The connectivity unit 630 may support various types of network interfaces (e.g., communication interface 170 of FIG. 1). The connectivity unit may correspond to various types of communication protocols.

According to various embodiments, the cloud storage system 103 may include at least one storage unit 610. The cloud storage system 103 may include storage units that are located physically far from each other. The cloud storage system 103 may include a plurality of physical devices integrated as a logical device. The cloud storage system 103 may include a plurality of logical devices implemented within a physical device. The cloud storage system 103 may include a plurality of logical devices implemented differently in type with a plurality of physical devices.

In the following description, a device providing contents or requesting for sharing the contents is referred to as "electronic device" and a device receiving the contents or content sharing information is referred to as "target device" for convenience of explanation. This is just for convenience of explanation, and an electronic device also operates as a target device.

Figure 7:
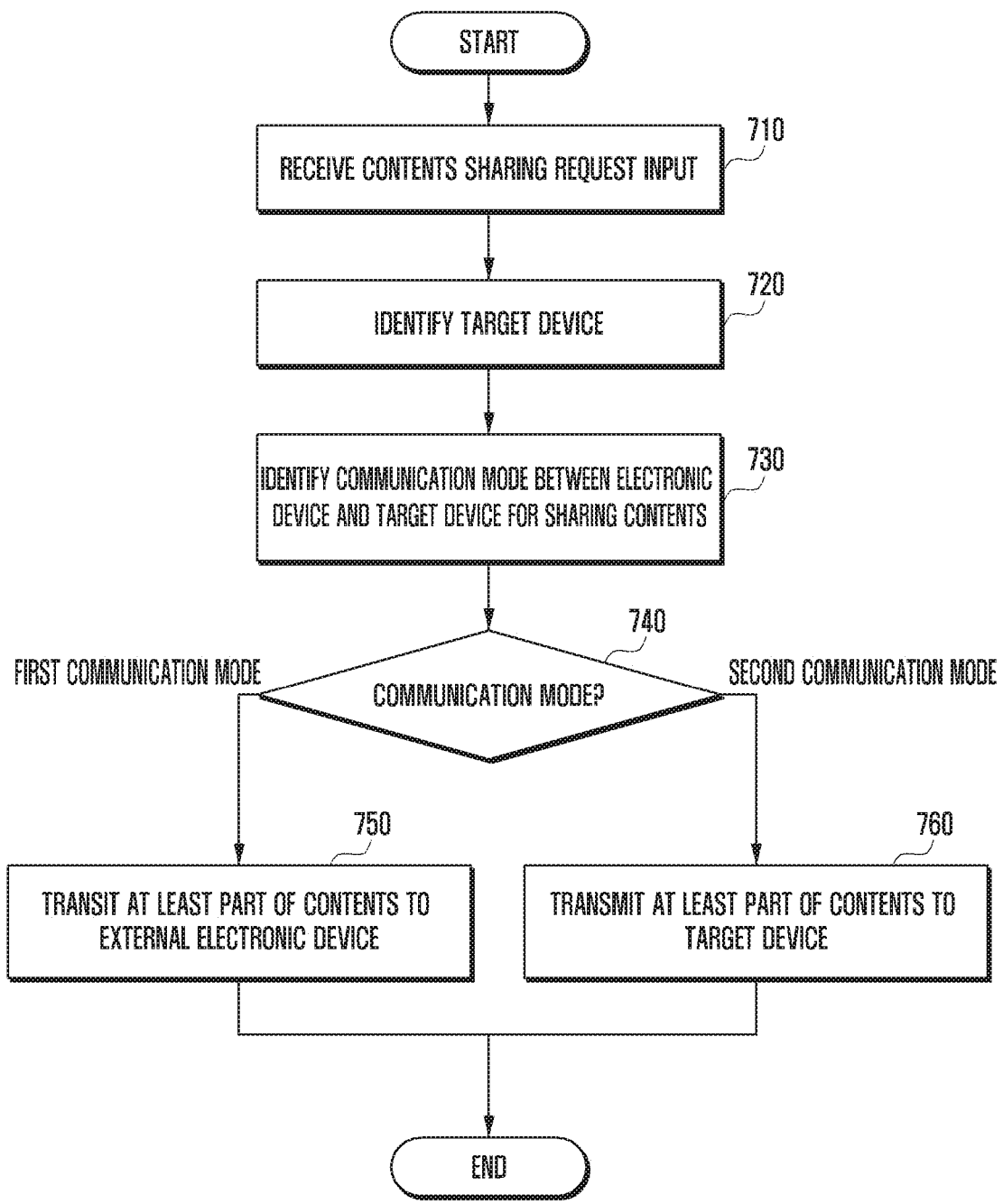
FIG. 7 is a flowchart illustrating an inter-electronic device content sharing method in a machine-to-machine communication system according to various embodiments of the disclosure.

FIG. 7 is a flowchart illustrating an inter-electronic device content sharing method in a machine-to-machine communication system according to various embodiments of the disclosure.

In the embodiment of FIG. 7, an electronic device may perform at least part of the functions of the machine-to-machine communication system (e.g., machine-to-machine communication system 104 of FIG. 4 and machine-to-machine communication system 104 of FIG. 5).

At step 710, the electronic device (e.g., electronic devices 101 and 102 of FIG. 1 and at least one electronic device 101 in FIG. 4) may receive a content sharing request input. For example, the electronic device may receive an input for selecting contents to be shared and requesting for sharing the contents. The electronic device may receive an input for selecting a target device for sharing the contents or an input for selecting a type of target devices.

By way of another example, the electronic device may receive an input for selecting contents to be shared via an application for accessing a machine-to-machine communication system (e.g., machine-to-machine communication system 104 in FIG. 4) or an input for selecting a target device for sharing the contents.

According to an alternative embodiment, if the content sharing request input is received, the electronic device may transmit at least one of content sharing request information or target device information to the machine-to-machine communication system to exchange information for content sharing with the machine-to-machine communication system in response to the content sharing request input.

At step 720, the electronic device may identify the target device (e.g., electronic devices 101 and 102 in FIG. 1 and at least one electronic device 101 in FIG. 4) for sharing the contents in response to the content sharing request command.

According to an embodiment, the electronic device may check the information registered with the machine-to-machine communication system to which the electronic device is connected for status of at least one target device for content sharing requested by the electronic device and capability of the target device.

According to an alternative embodiment, the electronic device may select the target device based on at least one of a type of the contents to be shared, properties information, information on statuses of other electronic devices registered with the machine-to-machine communication system, location of the electronic device, location of the target device, a user's selection input, or communication functions of the other electronic devices registered with the machine-to-machine communication system.

According to an alternative embodiment, if the electronic device receives the information on the type of the target device for sharing the contents in addition to the information on the contents to be shared, it may search for other electronic devices identical in type with the target device and select a target device for sharing and playing the contents.

According to an alternative embodiment, the electronic device may identify the target device in response to a selection input made by the user. For example, the user may execute an application for accessing the machine-to-machine communication system by means of the electronic device. The electronic device may provide the user with a list of other electronic devices capable of communicating with the electronic device via the application for accessing the machine-to-machine communication system and receive an input made by the user for selecting one of the other electronic devices (e.g., target device) to which the contents are provided.

At step 730, the electronic device may check for a communication mode for sharing contents with the selected target device.

According to an embodiment of the disclosure, the electronic device may determine a communication mode for sharing contents with the target device based on at least one of the content information, electronic device information, target device information, or user information, and identify the determined communication mode. The content information may include at least one of content metadata, properties information (e.g., capacity information, ratio information, information on a number of content items, and backup information), or digital content authoring management information. The electronic device information or the target device information may include at least one of device capacity information indicating capacity of the device, device status information indicating a specific status value, device event information indicating event information generated by the device, device location information indicating the location of the device, or device operation information indicating operation time and a number of operation times. The user information may include information on the user of the electronic device, information on the user of the target device (e.g., age information), and preference information of the target device. According to an embodiment of the disclosure, the electronic device may receive information on the communication mode determined to be used with the target device from the machine-to-machine communication system to which the electronic device is connected and identify the communication mode for use in sharing the contents with the target device.

According to various embodiments of the disclosure, the communication mode for use in sharing contents may be determined by referencing a configured rule or by referencing at least part of the information on the contents to be shared, the status information of the electronic device, the status information of the target device, or the user information.

For example, the electronic device or the machine-to-machine communication system may store a rule configured for determining a communication mode for use between the devices and determine a communication mode for use between the devices based on the stored rule. The rule may be configured as a rule set by referencing the status information of the electronic device, the status information of the target device, and the user information and may be generated by referencing a format authored by a terminal, an application, an application service manufacturer, or a user. For example, the user information may include information on the age of the user of the electronic device and device preference information of the user of the electronic device. For example, the configured rule may be stored in the form of a table of a relational database. By way of another example, the configured rule may be stored in the form of a decision making tree having the electronic device status information, the target device status information, and the user status information as internal nodes and the finally determined communication mode as a leaf node (or end node).

By way of another example, the electronic device or the machine-to-machine communication system may compare per-status conditions based on priorities of the electronic device status information, the target device status information, and the user status information to determine the communication mode for use between the electronic devices. For example, the electronic device or the machine-to-machine communication system may select at least one condition for determining a communication mode and determine a communication mode based on a result derived from per-condition priorities or weight values.

According to an embodiment, the electronic device or machine-to-machine communication system may determine a communication mode based on the following conditions. For example, the conditions are as follows.

First condition: Status of supporting a content sharing scheme of the electronic device and the target device Second condition: Network connectivity status of the electronic device and the target device (user location)

Third condition: Content metadata

Fourth condition: Information on any relationship between contents and the users of the electronic device and the target device According to an embodiment, the electronic device or the machine-to-machine communication system prioritizes the above conditions to determine one or more communication modes among various communications for sharing contents. It may be possible to determine two or more communication modes according to the number of the contents to be shared.

According to an embodiment, if the target device does not support an external system-based sharing scheme, the electronic device or the machine-to-machine communication system may select a direct communication mode for sharing contents.

According to an alternative embodiment, if the target device supports an external system-based sharing scheme, the electronic device or the machine-to-machine communication system may select a communication mode showing the highest data rate in a certain network status between the external system-based communication mode and an inter-device direction sharing scheme. According to an alternative embodiment, if both the electronic device and the target device have Wi-Fi connectivity, the electronic device or the machine-to-machine communication system may prioritize the external system-based communication mode and select the external system-based communication mode for sharing contents between the devices.

According to an alternative embodiment, if the electronic device and the target device are located close to each other within a predetermined distance, even though they are connected to a mobile communication network (e.g., 3G, 4G, and 5G cellular networks), the electronic device or the machine-to-machine communication system may prioritize the inter-device direction communication mode and select the direct communication mode for sharing contents between the devices.

According to an alternative embodiment, if the electronic device and the target device are not located close to each other within a predetermined distance and connected via a separate communication network (e.g., relationship between the electronic device located indoors and the target device located outdoors), the electronic device or the machine-to-machine communication system may select the external system-based communication mode for sharing contents between the devices. According to an alternative embodiment, if the electronic device and the target device are located close to each other and the target device cannot access the machine-to-machine communication system or the cloud server system (e.g., relationship between a smart TV device without a cloud server system access function and the electronic device), the electronic device or the machine-to-machine communication system may select the direct communication mode for sharing contents between the devices.

According to an embodiment, the electronic device or the machine-to-machine communication system may select a communication mode for sharing contents with the target device based on the properties information on the contents to be shared. For example, if the contents to be shared are at least one of a video having a long playback time, a plurality of picture contents, or a plurality of music contents, the electronic device or the machine-to-machine communication system may prioritize the external system-based communication mode in selecting a communication mode. According to an alternative embodiment, the electronic device or the machine-to-machine communication system may prioritize the direct communication mode for sharing-prohibited contents protected by digital rights management (DRM) (e.g., WiDi, Miracast, and Screen Mirroring) in order to transmit only a decoded part rather than the whole contents in selecting the communication mode for sharing contents. In the case of the sharing-prohibited DRM contents, it is obvious that a scheme for transmitting the contents in themselves such as Wi-Fi Direct cannot be used among the direct communication modes.

According to an embodiment, if the content information includes any personal information, the electronic device or the machine-to-machine communication system may prioritize the direct communication mode for sharing the contents between the devices. According to an alternative embodiment, if it is determined that the user of the electronic device is different from the user of the target device based on the properties information of the contents (e.g., information on age limit for the contents), the user information of the electronic device, or the user information of the target device and that the consumer of the contents and the user of the target device are identical with or similar to each other, the electronic device or the machine-to-machine communication system may prioritize the external system-based communication mode.

According to various embodiments of the disclosure, the electronic device or the machine-to-machine communication system may determine a communication mode based on various conditions as described above.

According to an embodiment, the electronic device or the machine-to-machine communication system may determine a communication mode by referencing the communication determination conditions, generate a control instruction for connecting the electronic device and the target device to the same network (e.g., same Wi-Fi network), and control the electronic device and the target device.

According to an embodiment of the disclosure, the electronic device or the machine-to-machine communication system may be configured to prioritize and select the external system-based communication mode among communication modes for sharing contents between devices and select, if it becomes impossible to use the external system-based communication mode according to the status of the electronic device or the target device, the direct sharing scheme for sharing the contents between the devices.

The electronic device may determine at step 740 whether the communication mode for sharing contents between the devices is the first communication mode and, if so, the procedure goes to step 750 at which the electronic device may transmit at least part of the contents to be shared to the external electronic device (e.g., cloud storage system 103 in FIG. 4).

According to an embodiment, the first communication mode may be an external system-based communication mode, and the electronic device may be, but is not limited to, the cloud storage system 103 depicted in FIG. 4 or 6. If the first communication mode is selected, the electronic device may transmit the contents to be shared and information indicating that the contents are to be shared to an external electronic device (e.g., cloud storage system 103 in FIG. 4 and cloud storage system 103 in FIG. 6). The electronic device may receive content resource access information for access to the location where the contents are stored from the external electronic device. For example, the location where the contents are stored may be the shared data storage space 612 of the cloud storage system of FIG. 6.

According to various embodiments, the electronic device may transmit to the target device a content sharing request including the content resource access information received from the external storage system. For example, if the content resource access information is received from the external storage system, the electronic device may transmit at least part of the content resource access information or a control instruction for playing the contents to the target device.

If the selected communication mode is the second communication mode rather than the first communication mode, the procedure goes to step 760 at which the electronic device may transmit at least part of the contents or a sharing request to the target device. For example, the second communication mode may be a direct communication mode or an internal system-based communication mode.

According to an embodiment, the electronic device may transmit a direct communication connection request or a content sharing control instruction to the target device. For example, the direct communication connection request may include at least one of a sharing protocol for direct communication (e.g., DLNA) or communication mode (e.g., Wi-Fi Direct) information, a MAC or IP information for discovery of the electronic device, or a connection command including connection information.

According to an alternative embodiment, if the second communication mode is selected for sharing contents, the machine-to-machine communication system may request to the electronic device and the target device for mode switching to the direct communication mode. The electronic device and the target device may perform mode switching to the direct communication mode and exchange information related to the content sharing in the second communication mode.

Figure 8:
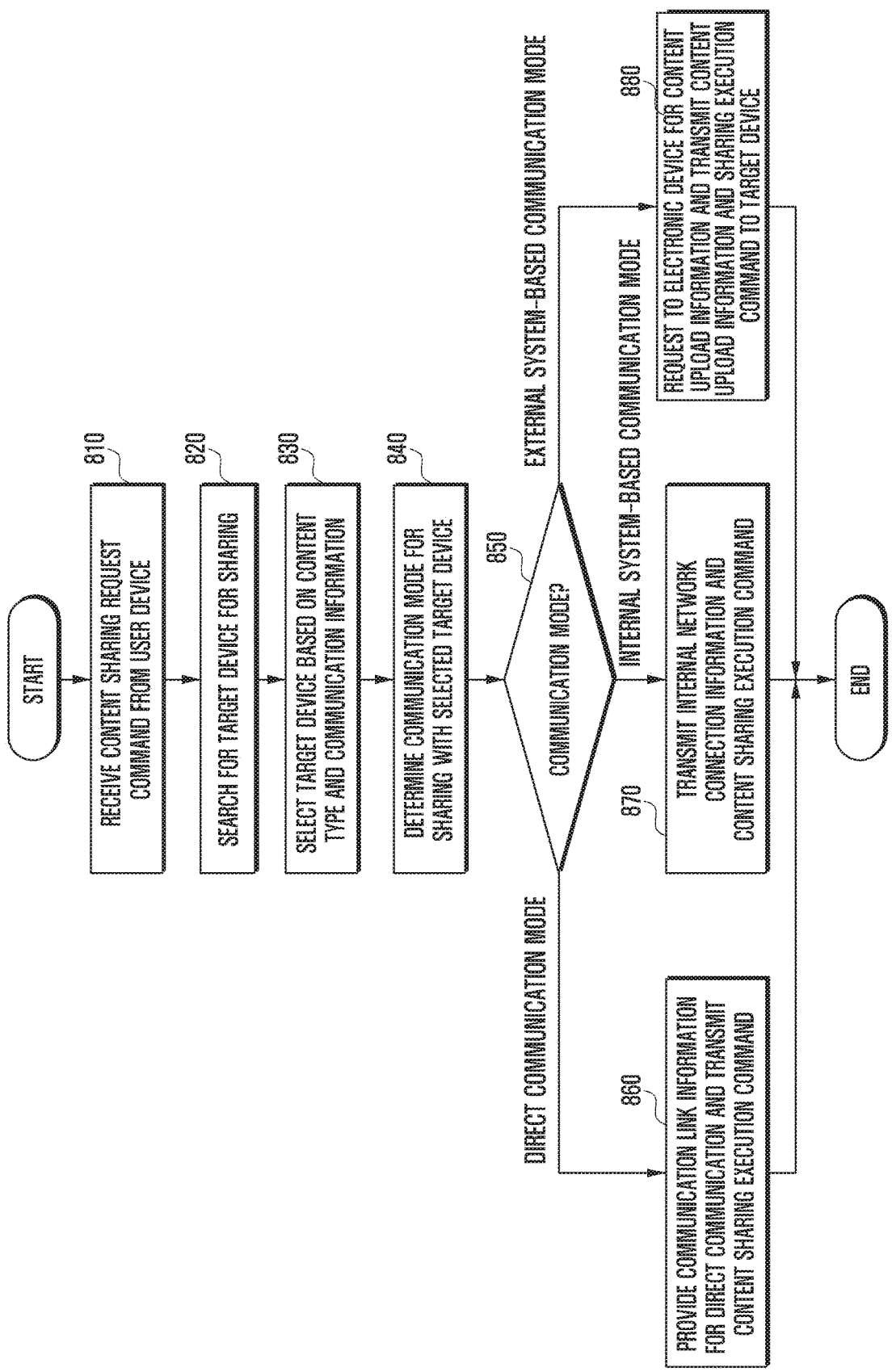
FIG. 8 is a flowchart illustrating a content sharing method of an electronic device according to various embodiments.

FIG. 8 is a flowchart illustrating a content sharing method of an electronic device according to various embodiments.

In the embodiment of FIG. 8, the inter-device content sharing method may be controlled by a machine-to-machine communication system to which at least one electronic device is connected.

At step 810, the machine-to-machine communication system (e.g., machine-to-machine communication system 104 in FIG. 4 and machine-to-machine communication system 104 in FIG. 5) may receive a content sharing request from at least one electronic device (e.g., electronic devices 101 and 102 in FIG. 1 and at least one electronic device 101 in FIG. 4). For example, the content sharing request may include at least one of information on the contents to be shared, information on another electronic device for sharing contents therewith, or information on a device type for selecting a candidate group.

At step 820, the machine-to-machine communication system may search for target devices for sharing contents. For example, the machine-to-machine communication system may search for other electronic devices that have been registered with the same account information as the electronic device on the basis of the account information of the electronic device or that are identical in type with the electronic device on the basis of device type information transmitted by the electronic devices as the target devices.

At step 830, the machine-to-machine communication system may select a target device based on information on the contents to be shared and information on the status of the other electronic devices among the other electronic devices capable of communicating with the electronic device.

For example, the machine-to-machine communication system may select a target device based on a user's selection information received from the electronic device or device type information for selecting the candidate group.

By way of another example, the machine-to-machine communication system may select a target device based on at least one of the type of contents to be shared, content properties information, or information on other electronic devices registered with the machine-to-machine communication system.

At step 840, the machine-to-machine communication system may determine a communication mode for sharing contents between the electronic device and the target device. According to an embodiment of the disclosure, the machine-to-machine communication system may determine a communication mode based on at least one communication mode selection condition. Examples of the communication mode selection condition may include, but is not limited to, metadata of the contents, properties information of the electronic device, properties information of the target device, user data of the electronic device, and user data of the target device. How to determine a communication mode has been described with reference to FIG. 7 and thus is omitted herein.

The machine-to-machine communication system determines at step 850 whether the determined communication mode is a direct communication mode and, if so, transmits, at step 860, a connection establishment command for direct communication or a content sharing execution command to the electronic device and the target device. For example, the connection establishment command for direct communication may include at least one of information on a sharing protocol for direct communication (e.g., DLNA) or a communication mode (e.g., Wi-Fi Direct) and connection information. If the determined communication mode is an internal system-based communication mode, the machine-to-machine communication system may transmit internal network connection information and a content sharing execution command to the electronic device and the target device at step 870. For example, the internal network connection information may include MAC or IP information for discovering a target device or MAC or IP information for discovering the electronic device.

If the determined communication mode is an external system-based communication mode, the machine-to-machine communication system may request, at step 880, to the electronic device for content sharing information, e.g., content resource access information for access to a location where the contents to be shared are stored, and transmit, upon receipt of the content resource access information, the content resource access information to the target device.

For example, if the determined communication mode is the external system-based communication system, the machine-to-machine communication system may request to an external storage system (e.g., cloud storage system 103 in FIG. 4) for uploading contents and receive content resource access information for access to the contents uploaded by the electronic device.

By way of another example, the machine-to-machine communication system may directly communicate with the external storage system connected to the electronic device to receive content resource access information for accessing the contents uploaded and saved by the electronic device.

Figure 9:
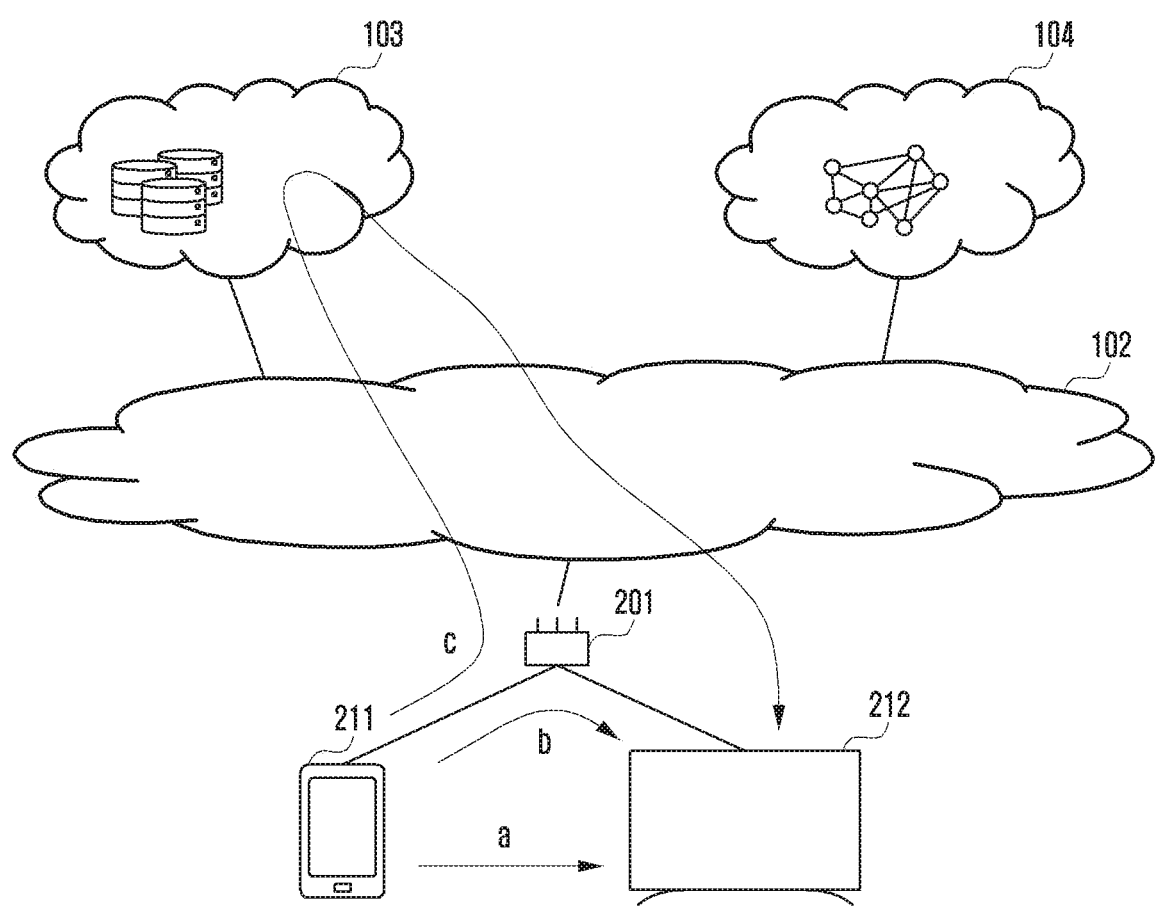
FIG. 9 is a diagram illustrating communication modes for sharing contents according to various embodiments of the disclosure.

FIG. 9 is a diagram illustrating communication modes for sharing contents according to various embodiments of the disclosure.

In the embodiment of FIG. 9, the electronic device 211 (e.g., electronic devices 101 and 102 in FIG. 1, electronic device 201 in FIG. 2, and electronic device 101 in FIG. 4) may share contents with another electronic device 212 (e.g., electronic device 101 in FIG. 1, electronic device 201 in FIG. 2, and electronic device 101 in FIG. 4) (or a target device) in various communication modes. The electronic device 211 or another electronic device 212 may connect to a cloud server system 103 (e.g., cloud storage system 103 in FIG. 4, cloud storage system 103 in FIG. 6) and a machine-to-machine communication system 104 (e.g., machine-to-machine communication system 104 in FIG. 4 and machine-to-machine communication system 104 in FIG. 5) via a network 102 (e.g., network 162 in FIG. 1).

According to various embodiments, the electronic device 211 may share contents with the other electronic device 212 in a direct communication mode, an internal system-based communication mode, or an external system-based communication mode.

In the direct communication mode the contents may be directly transmitted from the electronic device 211 to the other electronic device 212, by way of example, through a direct link established between the electronic device 211 and the other electronic device 212 as indicated by arrow a. The other electronic device 201 may receive the contents from the electronic device 211 and store and play the received contents.

In the internal system-based communication mode, the contents may be transmitted from the electronic device 211 to the other electronic device 212, by way of example, via an internal network 201 (e.g. router and access point device) to which the electronic device 211 and the other electronic device 212 are connected as indicated by arrow b. The other electronic device 212 may store or play the contents received via the internal network 201.

In the external system-based communication mode, the contents may be transmitted from the electronic device 211 to the other electronic device 212, by way of example, in such a way of transmitting and receiving the contents via the cloud storage system 103 to which the electronic device and the other electronic device 212 are connected as indicated by arrow c. For example, the electronic device 211 may store the contents to be shared in the cloud storage system 103 via the communication network 102 and receive content resource access information for the stored contents. The other electronic device 212 may access a storage unit of the cloud storage system 103 based on the content resource access information associated with the contents to receive at least part of the shared contents. The other electronic device 212 may play or store the received contents whenever necessary.

Figure 10:
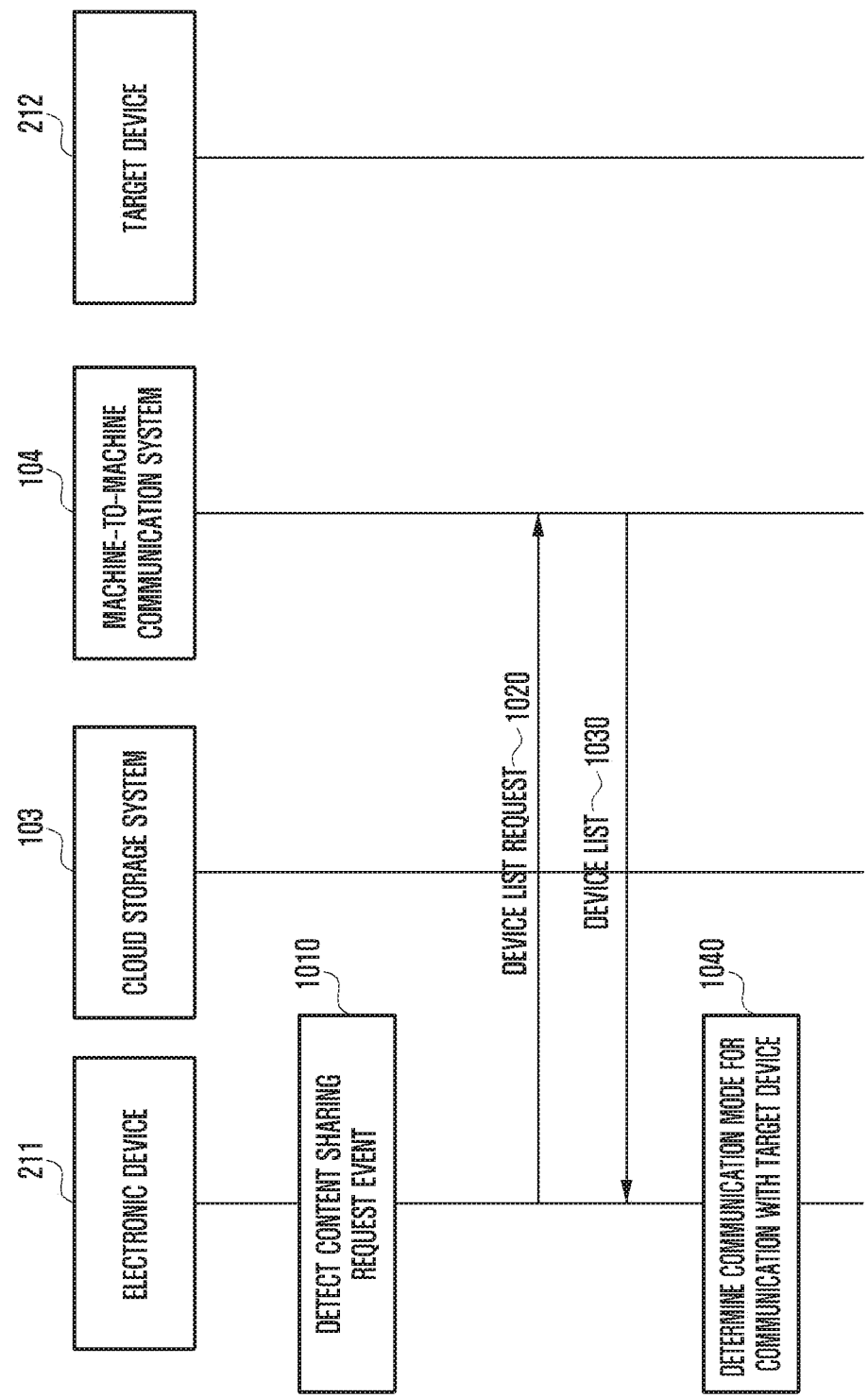
FIGS. 10 and 11 are signal flow diagrams illustrating an inter-electronic device communication mode determination method according to various embodiments of the disclosure.
Figure 11:
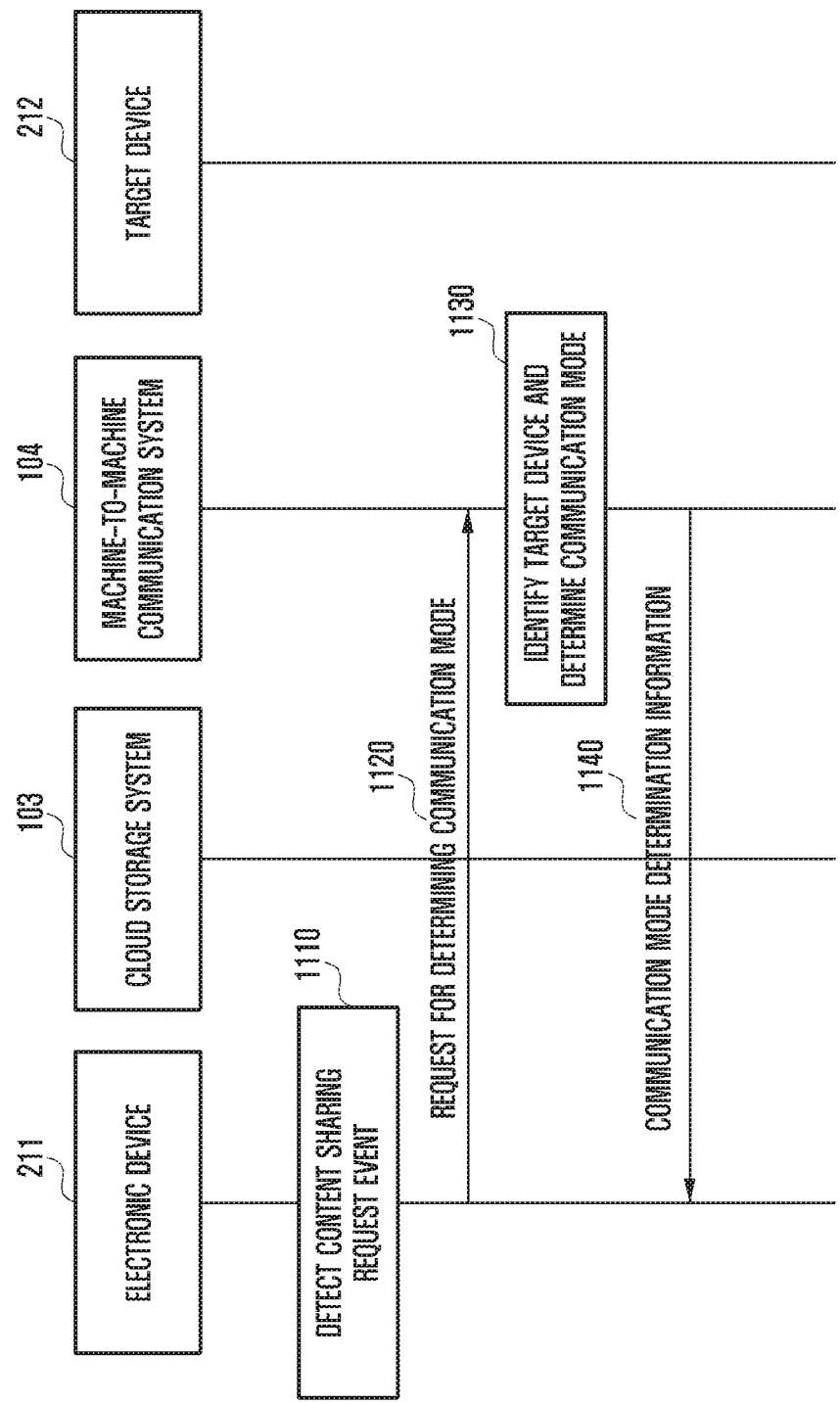

FIGS. 10 and 11 are signal flow diagrams illustrating an inter-electronic device communication mode determination method according to various embodiments of the disclosure.

In the inter-electronic device content sharing method according to the embodiment of FIG. 10, an electronic device 211 (e.g., electronic device 101 and 102 in FIG. 1, electronic device 201 in FIG. 2, and electronic device 101 in FIG. 4) may independently determine a communication mode for use in sharing contents with another electronic device 212 (e.g., electronic devices 101 and 102 in FIG. 1, electronic device 201 in FIG. 2, and electronic device 101 in FIG. 4).

According to an embodiment, the electronic device 211 may detect a content sharing request event at step 1010. For example, the electronic device 211 may receive an input for selecting the contents to be shared and for requesting for sharing the contents. For example, the content selection and sharing request input may be made in the form of at least one of a touch input, a keyword input, or a voice command input.

At step 1020, the electronic device 211 may transmit a command requesting for a target device list for content sharing to a machine-to-machine communication system 104 (e.g., machine-to-machine communication system 104 in FIG. 4 and machine-to-machine communication system 104 in FIG. 5) to which the electronic device is connected, upon detection of the content sharing request event.

According to an embodiment, the target device list request command may be at least one of a command requesting for a list of devices associated with the electronic device 211 being managed by the machine-to-machine communication system or a command requesting for information necessary in device selection and communication mode determination. For example, the command may include information indicating the target device 212 (e.g., electronic device 101 in FIG. 1 and electronic device 101 in FIG. 4) for sharing contents and information on candidate target devices with at least one function necessary for controlling contents.

At step 1030, the electronic device 211 may receive a target device list for sharing the contents from the machine-to-machine communication system. The electronic device 211 may identify the target device for sharing the contents based on the received target device list. For example, the target device list may include identity information of at least one other electronic device registered with the machine-to-machine communication system.

For example, if the target device 212 for sharing contents is selected based on a determination made by the machine-to-machine communication system 104, the electronic device 211 may identify the target device based on the identification information of the selected electronic device. By way of another example, if the information on the candidate target devices is received, the electronic device 211 displays the information on the candidate target devices to the user via a display to receive a user input for selecting the target device 212.

At step 1040, the electronic device 211 may determine a communication mode for use with the target device 212. According to an embodiment of the disclosure, the electronic device 211 may prioritize the candidate target devices based on communication mode selection conditions to determine the communication mode. The communication mode selection conditions may include, but are not limited to, metadata of the contents, property information of the electronic device 211, property information of the target device, user data of the electronic device, and user data of the target device.

In reference to FIG. 11, the electronic device 211 (e.g., electronic device 101 in FIG. 1 and electronic device 101 in FIG. 4) may receive information on a communication mode for use with another electronic device (e.g., electronic device 101 in FIG. 1 and electronic device 101 in FIG. 4) (hereinafter, target device 212) from a machine-to-machine communication system 104 (e.g., machine-to-machine communication system 104 in FIG. 4)

According to an embodiment, the electronic device 211 may detect a content sharing event at step 1110. For example, the electronic device 211 may receive an input for selecting the contents to be shared and for requesting for sharing the contents. For example, the content selection and sharing request input may be made in the form of at least one of a touch input, a keyword input, or a voice command input. The electronic device 211 may receive an input for selecting a target device to which the contents are to be provided. For example, the target device 212 may be selected in such a way of making an input for selecting another electronic device, a type of the target device, or a function executable by the target device.

At step 1120, the electronic device 211 may transmit a request for determining a communication mode for sharing contents with the target device to the machine-to-machine communication system 104 (e.g., machine-to-machine communication system 104 in FIG. 4 and machine-to-machine communication system 104 in FIG. 5). At step 1130, the machine-to-machine communication system 104 may identify the target device 212 (e.g., electronic device 101 in FIG. 1 and electronic device 101 in FIG. 4) and determine a communication mode for communication with the target device 212 in response to the request from the electronic device 211. The operation for identifying the target device 212 and determining the communication mode for communication with the target device 212 may be performed in the same manner as that described with reference to FIGS. 7 and/or 8, and a detailed description thereof is omitted herein.

At step 1140, the machine-to-machine communication system 104 may transmit information on the determined communication mode to the electronic device 211.

Figure 12:
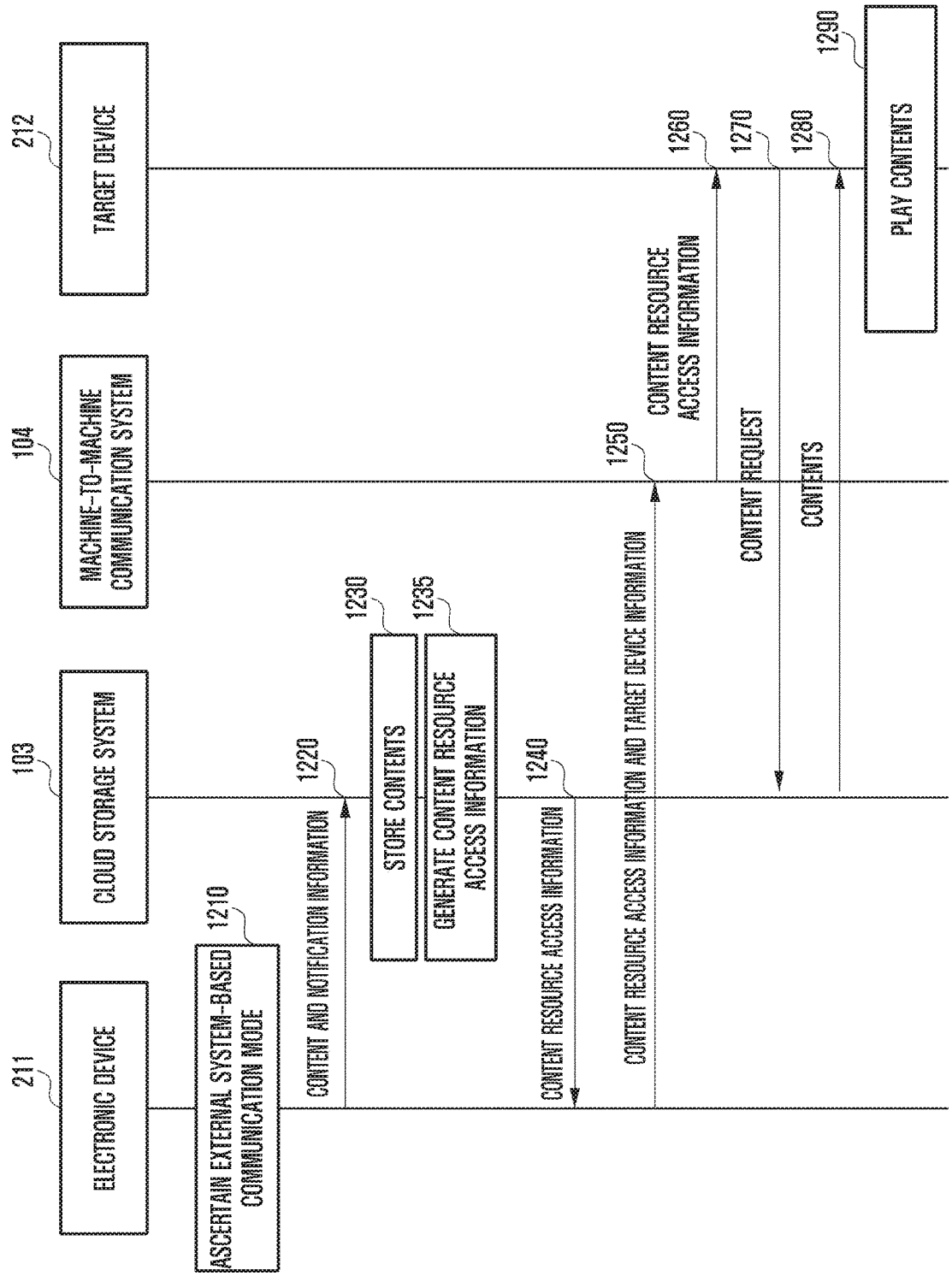
FIGS. 12 and 13 are signal flow diagrams illustrating an inter-electronic device content sharing method according to various embodiments of the disclosure.
Figure 13:
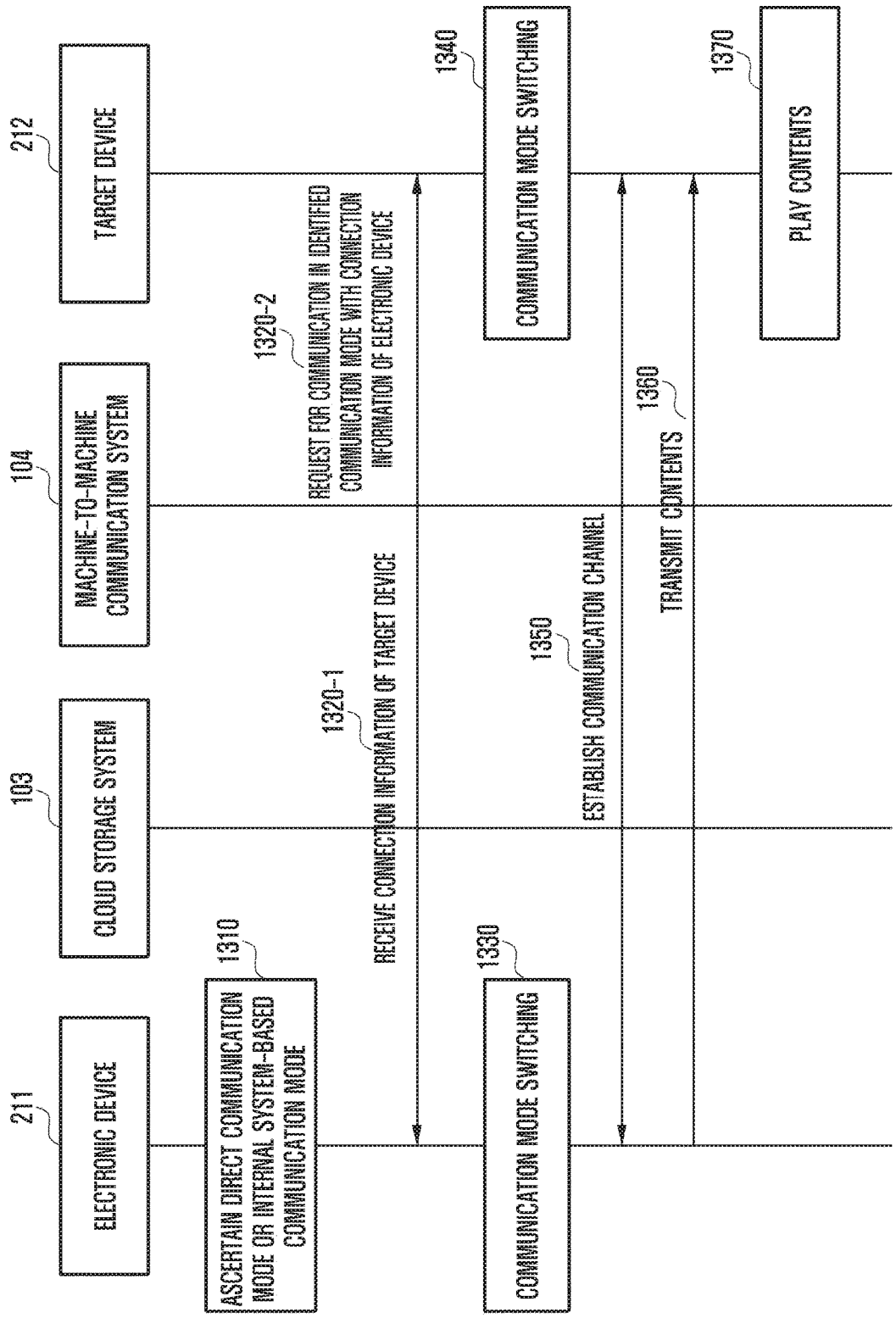

FIGS. 12 and 13 are signal flow diagrams illustrating an inter-electronic device content sharing method according to various embodiments of the disclosure.

In the embodiment of FIG. 12, an electronic device 211 may control to share contents with another electronic device in an external system-based communication mode.

At step 1210, the electronic device 211 (e.g., electronic device 101 in FIG. 1 and electronic device 101 in FIG. 4) may ascertain that an external system-based communication mode is in use for sharing contents. The electronic device 211 may determine the communication mode by previously performing the procedure of FIG. 10 or ascertain the communication mode based on information about the communication mode for sharing contents that was previously determined and transmitted by the machine-to-machine communication system 104 (e.g., machine-to-machine communication system 104 in FIG. 4 and machine-to-machine communication system 104 in FIG. 5) through the procedure of FIG. 11.

At step 1220, the electronic device 211 may transmit at least part of the contents and notification information indicating that the contents are to be shared to a cloud storage system 103 (e.g., cloud storage system 103 in FIG. 4 and cloud storage system 103 in FIG. 6).

At step 1230, the cloud storage system 103 may recognize the contents to be shared based on the notification information from the electronic device 211 and store the at least part of the contents in a shared data storage space (e.g., shared data storage space 612 in FIG. 6).

According to an embodiment, the electronic device 211 may include information indicating whether the contents to be shared are stored in a user data storage space of the cloud storage system 103 in the notification information. If it is determined that the contents to be shared are stored in the user data storage space (e.g., user data storage space 611 in FIG. 6) based on the notification information, the cloud storage system 103 may copy the contents from the user data storage space to the shared data storage space.

At step 1235, the cloud storage system 103 may generate content resource access information for access from outside to the stored contents. For example, the content resource access information may be a URI for accessing to the contents stored in the shared data storage space or include a token for a URI or a structured data format (e.g., extensible markup language (XML) and javaScript object notation (JSON)) specifying a system access right and access method. At step 1240, the cloud storage system 103 may transmit the generated content resource access information to the electronic device 211.

At step 1250, the electronic device 211 may provide the machine-to-machine communication system 104 (e.g., machine-to-machine communication system 104 in FIG. 4) with the content resource access information and information on the target device 211.

According to an embodiment, the target device information may include, but is not limited to, the identity information of the target device 212 (e.g., electronic device 101 in FIG. 1 and electronic device 101 in FIG. 4) and candidate group information for selecting the target device 212 (e.g., executable function information or device type information of electronic device).

At step 1260, the machine-to-machine communication system 104 may transmit the content resource access information from the electronic device 211 to the target device 212. The machine-to-machine communication system 104 may transmit a control instruction including an instruction set, by way of example, for controlling the target device 212. The instruction set for controlling the target device 212 may include at least one of instructions for allowing the target device 212 to access the contents stored in the cloud storage system 103 via the network based on the content resource access information, e.g., power status control, input port status control, volume status control, network connection status control, and content access and playback application control instructions.

At step 1270, the target device 212 may access the cloud storage system 103 based on the content resource access information included in the control instruction received from the machine-to-machine communication system 104 to request for the contents shared by the electronic device. At step 1280, the target electronic device 212 may receive the contents from the cloud storage system 103. At step 1290, the target device 212 may play the contents based on the control instruction.

In the embodiment of FIG. 13, the electronic device 211 may share contents using an inter-device direct communication mode or an internal system-based communication system. At step 1310, the electronic device 211 (e.g., electronic device 101 in FIG. 1 and electronic device 101 in FIG. 4) may ascertain that a direct communication mode or an internal system-based communication mode is in use for sharing contents. For example, the electronic device 211 may determine the communication mode by previously performing the procedure of FIG. 10 or ascertain the communication mode based on the information about the communication mode for sharing contents that was previously determined and transmitted by the machine-to-machine communication system 104 through the procedure of FIG. 11. For example, the direct communication mode may be a 1:1 direct sharing method (e.g., Wi-Fi Direct, WiDi, Miracast, and Screen Mirroring), and the internal system-based communication mode may be a method of using an internal network (e.g., DLNA and AllShare). The machine-to-machine communication system 104 (e.g., machine-to-machine communication system 104 in FIG. 4) may identify the communication mode for sharing contents between the electronic device 211 and the target device 212 (e.g., electronic device 101 in FIG. 1 and electronic device 101 in FIG. 4) and transmit information on the direct communication mode or internal system-based communication mode to the respective devices.

At step 1320-1, the machine-to-machine communication system 104 may transmit connectivity information of the target device 212 to the electronic device 211. At step 1320-2, the machine-to-machine communication system 104 may transmit connectivity information of the electronic device 211 or information requesting for communication in the direct communication mode or the internal system-based communication mode to the target device 212. The machine-to-machine communication system 104 may include a control instruction for performing direct communication in the connectivity information being transmitted to the electronic device and the target device. For example, the connectivity information being transmitted to the electronic device 211 and the target device 212 may include information requesting for mode switching to a communication mode for establishing a direct communication channel.

According to an embodiment, the connectivity information being transmitted to the electronic device 211 may include network identity information (e.g., MAC address, IP address, and Device ID) of the target device 212. The connectivity information being transmitted to the target device 212 may include network identity information (e.g., MAC address, IP address, and Device ID) of the electronic device 211.

According to an alternative embodiment, the information requesting for mode switching to the direct communication mode or the internal system-based communication mode that is transmitted to the electronic device 211 and the target device 212 may include information on a communication protocol for communication between the electronic device 211 and the target device 212. For example, the communication protocol may be one of Wi-Fi Direct, WiDi, Miracast, Screen Mirroring, DLNA, and AllShare.

According to an alternative embodiment, the information requesting for mode switching to the direct communication mode or the internal system-based communication mode that is transmitted to the electronic device 211 and the target device 212 may include information on a host-client mode between the electronic device 211 and the target device 212. For example, it may be possible to request to the electronic device 211 for operating in a host mode and to the target device 212 for operating in a client mode.

At step 1330, the electronic device 211 may perform mode switching to a communication mode identified for use in sharing contents based on the request from the machine-to-machine communication system 104. At step 1340, the target device 212 may perform mode switching to a communication mode identified for use in sharing contents based on the request from the machine-to-machine communication system 104.

At step 1350, the electronic device 211 and the target device 212 may set up a connection and establish a communication channel for the direction communication mode or the internal system-based communication mode as a result of the communication mode switching. For example, if it is determined that the direction communication is performed in the Screen Mirroring mode in which the electronic device 211 operates in the client mode and the target device 212 operates in the host mode, the electronic device 211 may enter the client mode, the target device may enter the host mode, and the electronic device 211 may transmit at least part of the contents to the target device 212. By way of another example, if it is determined that the internal system-based communication is performed in the DLNA mode in which the electronic device 211 operates in the host mode and the target device 212 operates in the client mode, the electronic device may enter the host mode, the target device 212 may enter the client mode, and the target device 212 may request to the electronic device 211 for at least part of the contents.

At step 1360, the electronic device 211 may transmit the contents to be shared to the target device 211. The electronic device 211 may transmit to the target device 212 a content sharing/playback instruction along with the contents.

According to an embodiment, if the content transmission to the target device 212 is completed, the electronic device 211 may control to switch back the communication mode before mode switching to the direct communication mode for transmitting the contents.

At step 1370, the target device 211 may store the contents transmitted by the electronic device 211. The target device 212 may play the contents based on the content sharing-playback command.

Figure 14:
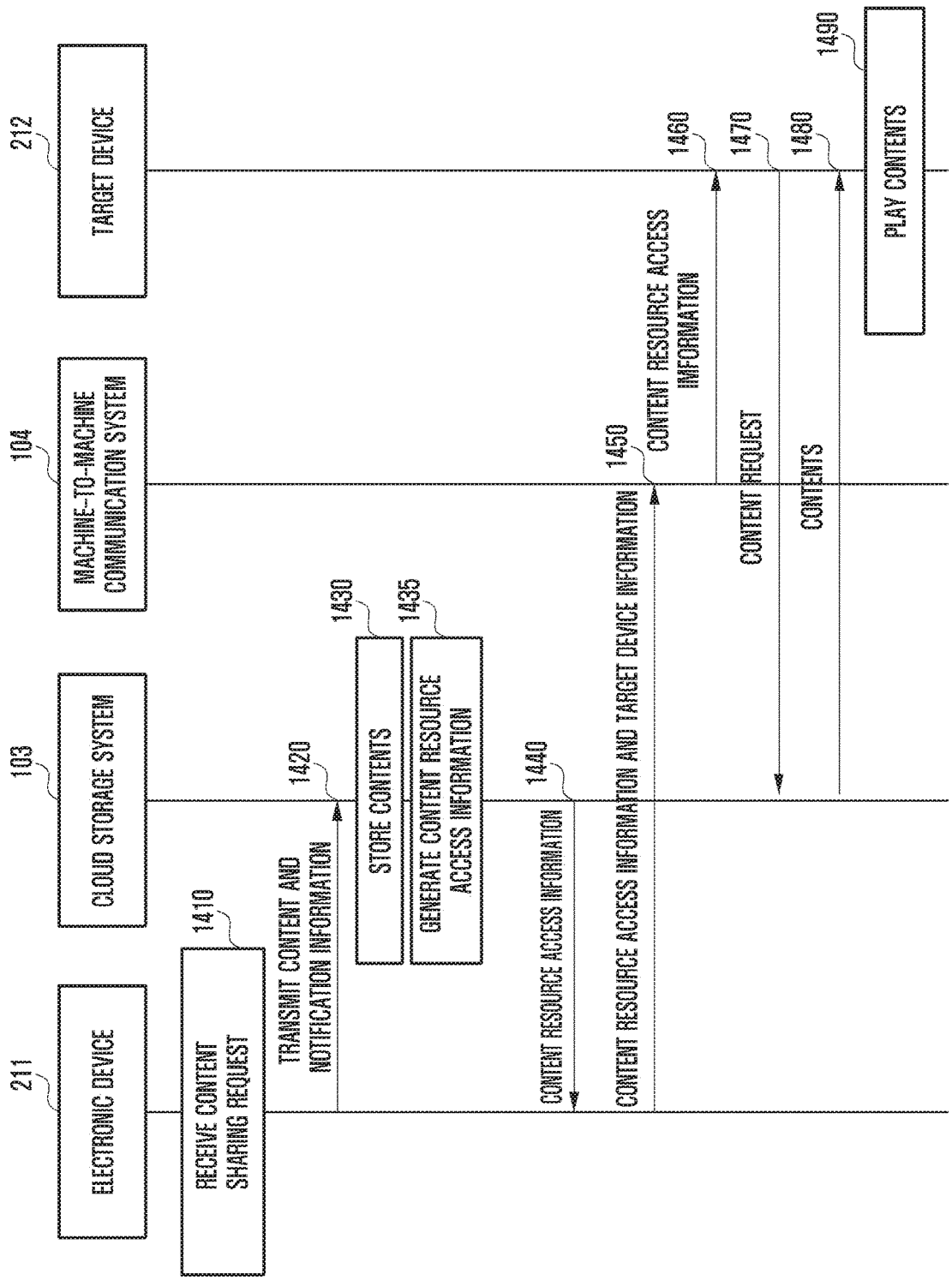
FIG. 14 is a signal flow diagram illustrating an inter-electronic device content sharing and playback method according to various embodiments of the disclosure.

FIG. 14 is a signal flow diagram illustrating an inter-electronic device content sharing and playback method according to various embodiments of the disclosure.

In the embodiment of FIG. 14, an electronic device 211 (e.g., electronic device 101 in FIG. 1 and electronic device 101 in FIG. 4) may support sharing contents in an external system-based communication mode in response to a content sharing request.

At step 1410, the electronic device 211 may receive a content sharing request. For example, the content sharing request may include at least one of information on input for selecting contents, information on a target device for sharing contents, or sharing request information.

At step 1420, if a content sharing request is received, the electronic device 211 may transmit at least part of the contents and notification information indicating that the contents are to be shared to a cloud storage system 103 (e.g., cloud storage system 103 of FIG. 4).

At step 1430, the cloud storage system 103 may recognize the contents to be shared based on the notification information from the electronic device 211 and store the at least part of the contents in a shared data storage space (e.g., shared data storage space 612 in FIG. 6). At step 1435, the cloud storage system 103 may generate content resource access information for the stored contents.

At step 1440, the cloud storage system 103 may transmit the generated resource access information to the electronic device. At step 1450, if the electronic device 211 receives the content resource access information from the cloud storage device 103, it may provide the machine-to-machine communication system 104 (e.g., machine-to-machine communication system 104 in FIG. 4) with the content resource access information and target device information.

According to an embodiment, the target device information may include, but is not limited to, identity information of the target device 212 (e.g., electronic device 101 in FIG. 1 and electronic device 101 in FIG. 4) and candidate group information for selecting the target device 212 (e.g., executable function information or device type information of the electronic device).

At step 1460, the machine-to-machine communication system 104 may transmit the content resource access information from the electronic device 211 to the target device 212. The machine-to-machine communication system 104 may transmit a control instruction including an instruction set, by way of example, for controlling the target device 212. The instruction set for controlling the target device 212 may include at least one of instructions for allowing the target device 212 to access the contents stored in the cloud storage system 103 via the network based on the content resource access information, e.g., power status control, input port status control, volume status control, network connection status control, and content access and playback application control instructions.

At step 1470, the target device 212 may access the cloud storage system 103 based on the content resource access information included in the control instruction received from the machine-to-machine communication system 104 to request for the contents shared by the electronic device. At step 1480, the target electronic device 212 may receive the contents from the cloud storage system 103. At step 1490, the target device 212 may play the contents based on the control instruction.

Figure 15:
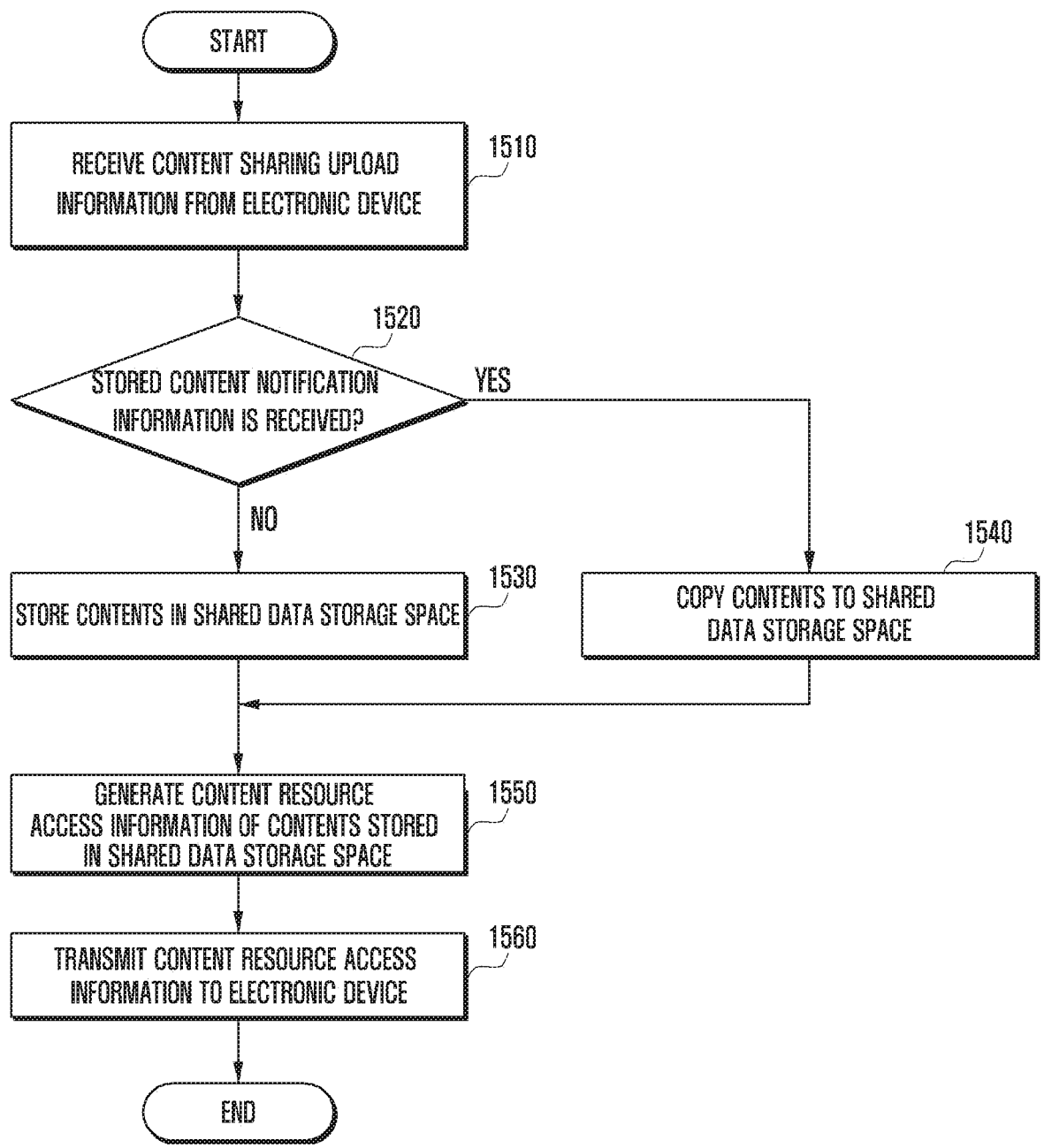
FIG. 15 is a flowchart illustrating an operation of a cloud storage system according to various embodiments of the disclosure.

FIG. 15 is a flowchart illustrating an operation of a cloud storage system according to various embodiments of the disclosure.

In the embodiment of FIG. 15, a cloud system (e.g., cloud storage system 103 in FIG. 4 and cloud storage system 103 in FIG. 6) may receive content sharing information from an electronic device 211 (e.g., electronic device 101 in FIG. 1 and electronic device 101 in FIG. 4) at step 1510. The content sharing information may include notification information indicating contents to be shared and at least part of the contents by way of example. If the contents to be shared are stored in a user data storage space (e.g., user data storage 611 in FIG. 6) of the cloud storage system 103, the content sharing information may include information indicating that the stored contents are to be shared. If the cloud storage system 103 receives the information indicating that the contents stored in the user data storage space are contents to be shared, it may determine, at step 1520, whether the contents to be shared are stored in its internal storage. If it is determined at step 1520 that the contents to be shared are stored in its internal storage, the cloud storage system 103 may copy the contents from the user data storage space to a shared data storage space (e.g., shared data storage space 612 in FIG. 6) at step 1540.

If it is determined that the contents to be shared are not stored in its internal storage, the cloud storage system 103 may store, at step 1530, the contents received from the electronic device 211 in the shared data storage space.

At step 1550, the cloud storage system 103 may generate content resource access information for access to the contents stored in the shared data storage space. At step 1560, the cloud storage system 103 may transmit the content resource access information for access from outside to the contents stored in the shared data storage to the electronic device 211, which has requested for content sharing.

According to various embodiments, the cloud storage system 103 may perform the following operation on the contents to be shared in a shared storage separately from the operation of FIG. 14.

For example, if there is a request for access to the shared storage based on the content resource access information from another electronic device (e.g., target device 212 in FIG. 14), the cloud storage system 103 may transmit the contents stored in the shared storage to the electronic device that has requested for the access.

Figure 16:
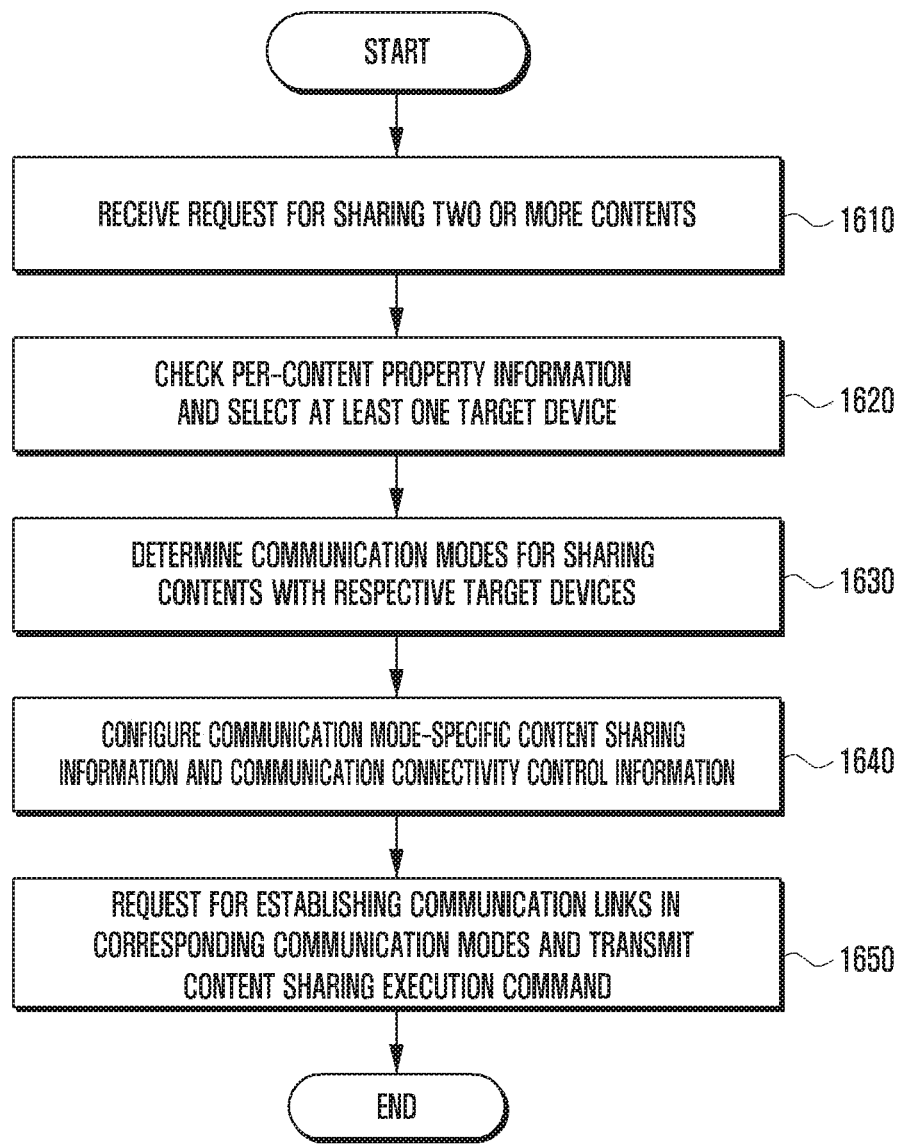
FIG. 16 is a flowchart illustrating an inter-electronic device content sharing method according to various embodiments of the disclosure.

FIG. 16 is a flowchart illustrating an inter-electronic device content sharing method according to various embodiments of the disclosure.

In the embodiment of FIG. 16, an electronic device (e.g., machine-to-machine communication system 104 in FIG. 4) may support a function of sharing at least two contents and controlling independent playback of the contents. Although the description is directed to a case where the machine-to-machine communication system performs the operations in this embodiment, the operation of FIG. 16 may be performed by another electronic device (e.g., electronic device 101 in FIG. 4).

According to an embodiment, the machine-to-machine communication system may receive, at step 1610, an input requesting for sharing two or more contents. For example, the machine-to-machine communication system may receive an input for selecting two or more contents to be shared and requesting for sharing the contents.

At step 1620, the machine-to-machine communication system may check the two or more contents for their property information and select at least one target device.

For example, if one of the contents is photo content and the other is music content, the machine-to-machine communication system may receive an input for selecting a device including a display as a target device for the photo content and a device capable of audio playback as a target device for the music content and select one of the target devices.

The machine-to-machine communication system may select a target device for the photo content and another target device for the music content among devices registered with the machine-to-machine communication system.

At step 1630, the machine-to-machine communication system may determine communication modes for sharing the contents with the respective target devices. For example, if a request for sharing a first content and a second content with one target device is received, the machine-to-machine communication system may determine to share the first content with the target device in a first communication mode and the second content with the target device in a second communication mode. By way of another example, the machine-to-machine communication system may determine to share the first content with a first target device in the first communication mode and the second content with a second target device in the second communication mode.

At step 1640, the machine-to-machine communication system may configure communication mode-specific communication connectivity information and control information for sharing the contents. At step 1650, the machine-to-machine communication system may request, to the electronic device (e.g., electronic device 211 in FIG. 14) and at least one target device (e.g., target device 212 in FIG. 14), for establishing communication links in the communication modes determined for the contents to be shared in respective manners and transmit a content sharing execution command to the at least one target device.

For example, the machine-to-machine communication system may control an electronic device to transmit family photos to a TV device in a direct communication mode such that the TV device plays the family photos that are directly received from the electronic device. The machine-to-machine communication system may control to transmit birthday greeting music and birthday greeting messages to another electronic device in order for the other device to output the birthday greeting music through an audio system and the birthday greeting messages on a display while the TV device displays the family photos.

Figure 17:
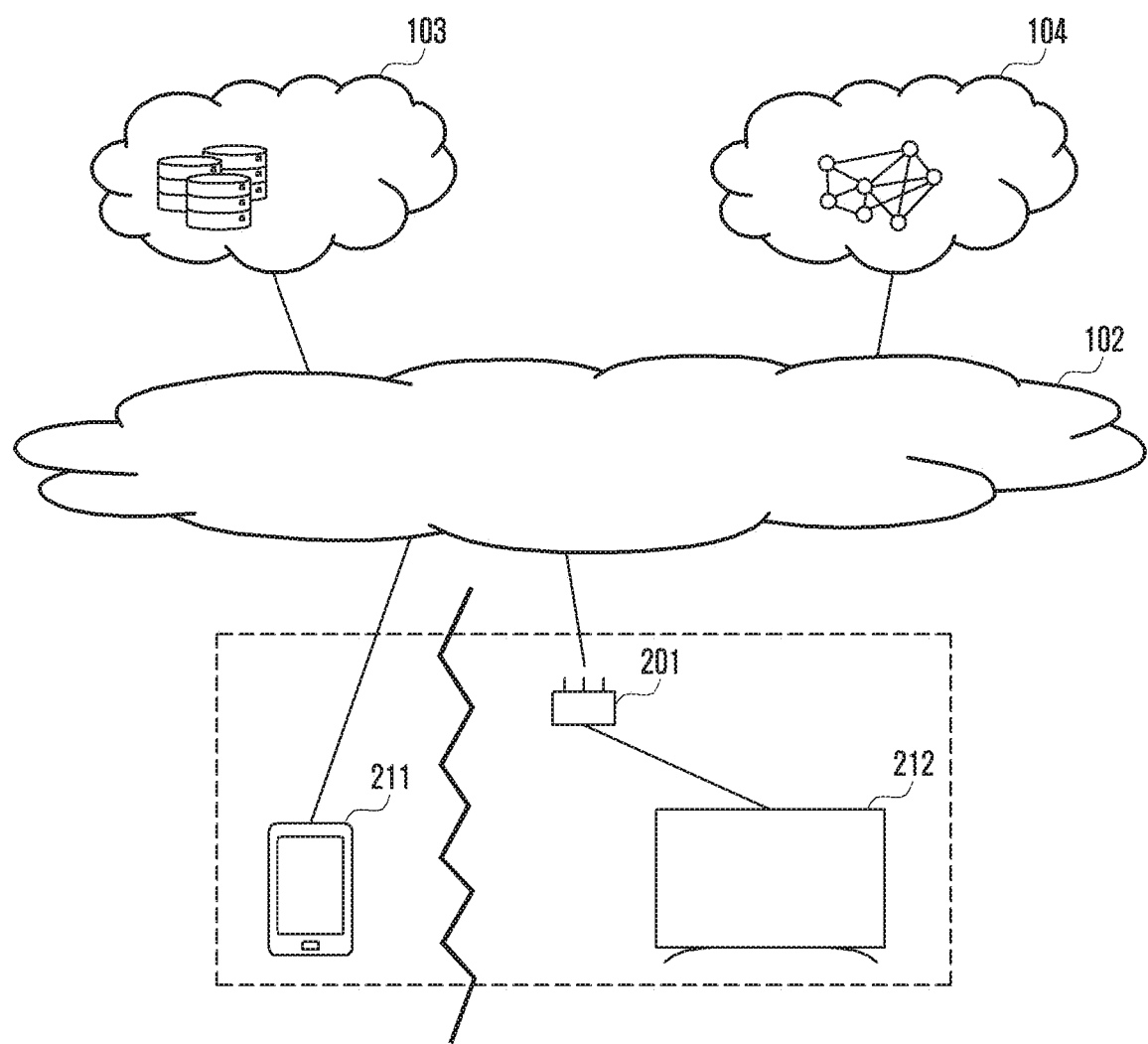
FIG. 17 is a diagram illustrating a situation of sharing contents in an inter-electronic device content sharing system according to an embodiment of the disclosure.

FIG. 17 is a diagram illustrating a situation of sharing contents in an inter-electronic device content sharing system according to an embodiment of the disclosure.

In the embodiment of FIG. 17, an electronic device 211 (e.g., electronic device 101 in FIG. 1 and electronic device 101 in FIG. 4) may determine a communication mode for sharing contents with a target device 212 based on location information or network connection information.

According to an embodiment, if the electronic device 211 and the target device 212 are connected to the same indoor network (e.g., same Wi-Fi AP) in the same space (e.g., home) and are capable of accessing a cloud storage system 103 and a machine-to-machine communication system 104, respectively, for sharing contents, they may select one of a direct communication mode and an external system-based communication mode depending on the situation.

According to an alternative embodiment, if the electronic device 211 and the target device 212 are not connected to the same indoor network (e.g., same Wi-Fi AP) in the same space or if the target device 212 cannot connect to the cloud storage system 103 (e.g., cloud storage system 103 in FIG. 4) or the machine-to-machine communication system 104 (e.g. machine-to-machine communication system 104 in FIG. 4), the electronic device 211 and the target device 212 may communicate in the direct communication mode for sharing contents. In this case, the electronic device 211 and the target device 212 may be located close to each other within a predetermined distance range.

According to various embodiments of the disclosure, the electronic device 211 (e.g., electronic device 101 in FIG. 1 and electronic device 101 in FIG. 4) may register information on another electronic device (e.g., target device 212) with the machine-to-machine communication system 104 for sharing contents. For example, if there is an electronic device (e.g., one of candidate target devices) that is capable of accessing the Internet via an internal network, but it is incapable of accessing the machine-to-machine communication system 104, the electronic device 211 may register with the information on the corresponding electronic device that is incapable of accessing the machine-to-machine communication system 104 and receive information for use in sharing the contents with the registered device, information for use in playing the contents, and control information. For example, if a device registered with the machine-to-machine communication system 104 is the target device 212, this means that the target device 212 is capable of accessing the Internet via the internal network; thus, the machine-to-machine communication system 104 may control the electronic device 211 that has requested for sharing contents to connect to the internal network to which the target device 212 is connected for sharing contents.

According to various embodiments of the present disclosure, the term "module", means, but is not limited to, a software, hardware, or firmware unit, and it may be interchangeably used with the terms "logic", "logical block", "component", or "circuit". The term "module" may indicate an integrated component or a smallest unit responsible for at least one function or a part thereof. A module may be implemented mechanically or electronically, and it may include at least one of an Application-Specific Integrated Circuit (ASIC) chip, a Field-Programmable Gate Array (FPGA), and a programmable logic device that is already known or to be developed. The apparatuses (e.g., modules and functions thereof) or methods (e.g., operations) according to various embodiments of the present invention may be implemented in the form of computer-executable program commands stored in a computer-readable storage medium (e.g., memory 130). The commands may be executed by a processor (e.g., processor 120). The computer-readable storage medium may include a hard disk, a floppy disk, magnetic media (e.g., magnetic tape), an optical media (e.g., CD-ROM, DVD), magneto-optical media (e.g. floptical disk), and an internal memory. The commands include the language code executable by computers using the interpreter as well as the machine language codes created by a compiler. The modules or programming modules according to various embodiments may include at least one of the aforementioned components with omission of some components or addition of other components. The operations of the modules, programming modules, or other components may be executed in series, in parallel, recursively, or heuristically; some operations may be executed in different order, omitted, or extended with other operations.

The invention claimed is:

1. An electronic device comprising:
a communication module;
a memory configured to store contents; and
a processor configured to control to:
transmit a command requesting devices information to a machine-to-machine communication system in response to an input for sharing contents,
receive the devices information from the machine-to-machine communication system,
select a first external electronic device which to transmit the contents of the electronic device based on the devices information,
determine a communication mode between the electronic device and the first external electronic device based on content information to be shared and the devices information,
transmit at least part of the contents to a second external electronic device using the communication module based on the determined communication mode being a first communication mode, wherein the second external electronic device is connected to the first external electronic device, and
transmit the at least part of the contents to the first external electronic device using the communication module based on the determined communication mode being a second communication mode,
acquire integrated resource access information supporting external access corresponding to the at least part of the contents transmitted based on the first communication mode, from the second external electronic device, and
transmit the integrated resource access information to the first external electronic device.

2. The electronic device of claim 1, wherein the processor is further configured to control to transmit notification information notifying the second electronic device that the at least part of the contents are to be shared with the first external electronic device as part of transmitting the at least part of the contents to the second external electronic device.

3. The electronic device of claim 1, wherein the processor is further configured to control to:
transmit a request for determining the communication mode to the machine-to-machine communication system, and
receive communication mode determination information from the machine-to-machine communication system in response to the request, as part of identifying the communication mode.

4. The electronic device of claim 3, wherein the processor is further configured to control to transmit metadata corresponding to the at least part of the contents or user data to the machine-to-machine communication system as part of the request for the determining of the communication mode to the machine-to-machine communication system.

5. The electronic device of claim 4, wherein the processor is further configured to control to transmit type information, length information, capacity information, or producer information of the at least part of the contents, as part of the metadata, to the machine-to-machine communication system.

6. The electronic device of claim 4, wherein the processor is further configured to control to transmit information on a location of a user of the electronic device or the first external electronic device or status information of the electronic device, as part of the user data, to the machine-to-machine communication system.

7. The electronic device of claim 1,
wherein the second external electronic device is an external storage system, and
wherein the processor is further configured to control to:
store data related to the contents in the external storage system that stores resource access information related to the contents based on the communication mode being the first communication mode,
receive resource access information for access to the contents from the external storage system,
transmit the resource access information for access to the contents to the first external electronic device, establish a communication channel with the first external electronic device in the second communication mode based on the communication mode being the second communication mode and based on connection information for direct connection with the first external electronic device and a control command for communication mode switching, and transmit the contents to be shared to the first external electronic device.

8. A content sharing method of an electronic device, the method comprising:

checking for contents to be shared;

transmitting a command requesting devices information to a machine-to-machine communication system in response to an input for sharing contents;

receiving the devices information from the machine-to-machine communication system;

selecting a first external electronic device which to transmit the contents of the electronic device based on the devices information;

determining a communication mode between the electronic device and the first external electronic device based on content information to be shared and the devices information;

transmitting at least part of the contents to a second external electronic device using a communication module based on the determined communication mode being a first communication mode, wherein the second external electronic device is connected to the first external electronic device;

transmitting the at least part of the contents to the first external electronic device using the communication module based on the determined communication mode being a second communication mode;

acquiring integrated resource access information supporting external access corresponding to the at least part of the contents transmitted based on the first communication mode, from the second external electronic device; and transmitting the integrated resource access information to the first external electronic device.

9. The method of claim 8, wherein the transmitting of the at least part of the contents to the second external electronic device comprises transmitting notification information notifying the second external electronic device that the contents are to be shared with the first external electronic device.

10. The method of claim 8, wherein the determining of the communication mode comprises:

transmitting a request for determining the communication mode to the machine-to-machine communication system; and receiving communication mode determination information from the machine-to-machine communication system in response to the request.

11. The method of claim 8, wherein the determining of the communication mode comprises determining the communication mode based on at least one of metadata of the contents, property information of the contents, device capacity information indicating execution capacity of the device, device status information indicating a specific status value of the device, location information of the device, or user information for identifying a user of the device.

* * * * *